US011224838B2

(12) United States Patent
Luo et al.

(10) Patent No.: US 11,224,838 B2
(45) Date of Patent: Jan. 18, 2022

(54) CONTROLLING AEROSOL PRODUCTION DURING ABSORPTION IN AMMONIA-BASED DESULFURIZATION

(71) Applicant: Jiangnan Environmental Protection Group Inc., Grand Cayman (KY)

(72) Inventors: Jing Luo, Nanjing (CN); Yongying Luo, Nanjing (CN); Jinyong Wang, Nanjing (CN)

(73) Assignee: Jiangnan Environmental Protection Group Inc., Grand Cayman (KY)

( * ) Notice: Subject to any disclaimer, the term of this patent is extended or adjusted under 35 U.S.C. 154(b) by 0 days.

(21) Appl. No.: 16/935,536

(22) Filed: Jul. 22, 2020

(65) Prior Publication Data

US 2021/0197117 A1 Jul. 1, 2021

(30) Foreign Application Priority Data

Dec. 26, 2019 (CN) .......................... 201911361251.1

(51) Int. Cl.
*B01D 53/14* (2006.01)
*B01D 53/18* (2006.01)
*B01D 53/50* (2006.01)
*B01D 53/78* (2006.01)
*B01D 9/00* (2006.01)
*C01C 1/247* (2006.01)

(52) U.S. Cl.
CPC ....... *B01D 53/1481* (2013.01); *B01D 9/0031* (2013.01); *B01D 53/1406* (2013.01); *B01D 53/1412* (2013.01); *B01D 53/1418* (2013.01); *B01D 53/1493* (2013.01); *B01D 53/185* (2013.01); *B01D 53/507* (2013.01); *B01D 53/78* (2013.01); *C01C 1/247* (2013.01); *B01D 2252/102* (2013.01)

(58) Field of Classification Search
CPC ............ B01D 53/1481; B01D 53/1412; B01D 53/50; B01D 53/502; B01D 53/507; B01D 53/78; B01D 2251/2062; B01D 2251/2065; B01D 2251/102; B01D 2257/102; B01D 2257/302; B01D 2258/0283; B01D 2259/12; B01J 10/00; B01J 10/002; B01J 19/002; B01J 19/0033; B01J 2219/00049; B01J 2219/00186; B01J 2219/00245; B01J 2219/0025; B01J 2219/00957
See application file for complete search history.

(56) References Cited

U.S. PATENT DOCUMENTS

| | | |
|---|---|---|
| 2,810,627 A | 10/1957 | Johnstone et al. |
| 3,752,877 A | 8/1973 | Beavon |
| 3,983,217 A | 9/1976 | Muraki et al. |
| 4,250,160 A | 2/1981 | Eakman |
| 4,294,590 A | 10/1981 | Linde et al. |
| 4,324,776 A | 4/1982 | Kim |
| 4,378,977 A | 4/1983 | Linde et al. |
| 4,552,747 A | 11/1985 | Goar |
| 4,690,807 A | 9/1987 | Saleem |
| 5,019,361 A | 5/1991 | Hakka |
| 5,106,607 A | 4/1992 | Chopin et al. |
| 5,362,458 A | 11/1994 | Saleem et al. |
| 5,632,967 A | 5/1997 | Nasato |
| 6,063,352 A | 5/2000 | Risse et al. |
| 6,066,304 A | 5/2000 | Freetly et al. |
| 6,139,807 A | 10/2000 | Risse et al. |
| 6,221,325 B1 | 4/2001 | Brown et al. |
| 6,444,185 B1 | 9/2002 | Nougayrede et al. |
| 6,508,998 B1 | 1/2003 | Nasato |
| 6,569,398 B2 | 5/2003 | Fenderson |
| 6,616,908 B2 | 9/2003 | Watson et al. |
| 6,776,974 B1 | 8/2004 | Burmaster et al. |
| 6,991,771 B2 | 1/2006 | Duncan et al. |
| 7,351,392 B2 | 4/2008 | Chen et al. |
| 7,635,408 B2 | 12/2009 | Mak et al. |
| 7,648,692 B2 | 1/2010 | Chow et al. |
| 7,754,471 B2 | 7/2010 | Chen et al. |
| 7,879,135 B2 | 2/2011 | Ravikumar et al. |
| 7,910,077 B2 | 3/2011 | Chow et al. |
| 8,178,070 B2 | 5/2012 | Wong et al. |
| 8,206,669 B2 | 6/2012 | Schaffer et al. |
| 8,361,432 B2 | 1/2013 | Parekh et al. |
| 8,444,943 B2 | 5/2013 | Lamar |
| 8,545,793 B2 | 10/2013 | Thielert |
| 8,871,176 B2 | 10/2014 | Liu et al. |

(Continued)

FOREIGN PATENT DOCUMENTS

| | | |
|---|---|---|
| CN | 1280032 A | 1/2001 |
| CN | 201880482 U | 6/2001 |

(Continued)

OTHER PUBLICATIONS

Wende Xiao and Zhiquan Wu, "Sulfur Dioxide Removal and Recovery," Chemical Industry Press (China), 143-145, May 2001.
Yang Yang, "Sulfur Dioxide Emission Reduction Technology and Flue Gas Desulfurization Project," Metallurgical Industry Press (China), 184-187, Jan. 2004.
Ke Zhang, "Industrial Chemistry," Commercial Press (China), 83-85, Jan. 1958.
Xianxi Ku, "Chemical Technology," Metallurgical Industry Press (China), 37-42, May 1995.
Zhuo Nan and Zengtai Zhao, "Nitrogen Fertilizer Industry," China Industry Press (China) 20-21, Mar. 1964.
Tianqi Liu and Xiaolin Huang, "Three Waste Treatment Engineering Technical Manual (part of Exhaust Gas)," Chemical Industry Press (China), 207-208, May 1999.

(Continued)

*Primary Examiner* — Timothy C Vanoy
(74) *Attorney, Agent, or Firm* — Weiss & Arons LLP

(57) ABSTRACT

Controlling aerosol production during absorption in ammonia-based desulfurization. The absorption reaction temperature, the oxygen content and water content of the process gas may be controlled, and an absorption circulating liquid containing ammonium sulfite may be used for removing sulfur dioxide in flue gas, so as to control aerosol production during absorption in the ammonia-based desulfurization.

44 Claims, 2 Drawing Sheets

(56) References Cited

U.S. PATENT DOCUMENTS

| | | | |
|---|---|---|---|
| 9,370,745 | B2 | 6/2016 | Xu et al. |
| 10,092,877 | B1 | 10/2018 | Luo et al. |
| 10,112,145 | B1 | 10/2018 | Luo et al. |
| 10,207,220 | B2 | 2/2019 | Luo et al. |
| 10,213,739 | B2 | 2/2019 | Luo et al. |
| 10,343,110 | B2 | 7/2019 | Luo et al. |
| 10,357,741 | B2 | 7/2019 | Luo et al. |
| 10,369,517 | B2 | 8/2019 | Luo et al. |
| 10,406,477 | B2 | 9/2019 | Luo et al. |
| 10,413,864 | B2 | 9/2019 | Luo et al. |
| 10,449,488 | B2 | 10/2019 | Luo et al. |
| 10,471,383 | B2 | 11/2019 | Luo et al. |
| 10,675,584 | B2 | 6/2020 | Luo et al. |
| 10,919,016 | B2 * | 2/2021 | Gansley ............... B01D 53/78 |
| 2003/0175190 | A1 | 9/2003 | Duncan et al. |
| 2007/0248518 | A1 | 10/2007 | Jung et al. |
| 2009/0004070 | A1 | 1/2009 | Chow et al. |
| 2011/0195008 | A1 | 8/2011 | Menzel et al. |
| 2011/0243822 | A1 | 10/2011 | Mortson |
| 2015/0273428 | A1 * | 10/2015 | Gansley ............... B01J 19/0033 423/155 |
| 2015/0352489 | A1 | 12/2015 | Luo et al. |

FOREIGN PATENT DOCUMENTS

| | | | | |
|---|---|---|---|---|
| CN | 1377722 | A | 11/2002 | |
| CN | 1178735 | C | 4/2003 | |
| CN | 1408464 | A | 4/2003 | |
| CN | 1164480 | C | 9/2004 | |
| CN | 2640584 | Y | 9/2004 | |
| CN | 2640585 | Y | 9/2004 | |
| CN | 2668235 | Y | 1/2005 | |
| CN | 1617831 | A | 5/2005 | |
| CN | 2 746 972 | Y * | 12/2005 | ............ B01D 53/78 |
| CN | 2746971 | Y | 12/2005 | |
| CN | 2746973 | Y | 12/2005 | |
| CN | 2754711 | Y | 2/2006 | |
| CN | 1251965 | C | 4/2006 | |
| CN | 2772609 | Y | 4/2006 | |
| CN | 2778373 | Y | 5/2006 | |
| CN | 2799059 | Y | 7/2006 | |
| CN | 2799060 | Y | 7/2006 | |
| CN | 1283346 | C | 11/2006 | |
| CN | 1321723 | C | 6/2007 | |
| CN | 2017 10115266 | A * | 12/2007 | ............ C01B 17/02 |
| CN | 101085410 | A | 12/2007 | |
| CN | 201030298 | Y | 3/2008 | |
| CN | 201052456 | Y | 4/2008 | |
| CN | 100395006 | C | 6/2008 | |
| CN | 201109711 | Y | 9/2008 | |
| CN | 100428979 | C | 10/2008 | |
| CN | 201129965 | Y | 10/2008 | |
| CN | 201132102 | Y | 10/2008 | |
| CN | 101352642 | A | 1/2009 | |
| CN | 201179415 | Y | 1/2009 | |
| CN | 100460045 | C | 2/2009 | |
| CN | 100475313 | C | 4/2009 | |
| CN | 101422693 | A | 5/2009 | |
| CN | 201231130 | Y | 5/2009 | |
| CN | 101524620 | A | 9/2009 | |
| CN | 201320447 | Y | 10/2009 | |
| CN | 201333376 | Y | 10/2009 | |
| CN | 101575103 | A | 11/2009 | |
| CN | 101585511 | A | 11/2009 | |
| CN | 201380037 | Y | 1/2010 | |
| CN | 201380038 | Y | 1/2010 | |
| CN | 201380039 | Y | 1/2010 | |
| CN | 201380040 | Y | 1/2010 | |
| CN | 100588608 | C | 2/2010 | |
| CN | 101642629 | A | 2/2010 | |
| CN | 201423237 | Y | 3/2010 | |
| CN | 101274750 | B | 6/2010 | |
| CN | 101745303 | A | 6/2010 | |
| CN | 201492952 | U | 6/2010 | |
| CN | 201529487 | U | 7/2010 | |
| CN | 201529488 | U | 7/2010 | |
| CN | 201537456 | U | 8/2010 | |
| CN | 101274196 | B | 12/2010 | |
| CN | 101182926 | B | 1/2011 | |
| CN | 101519192 | B | 2/2011 | |
| CN | 101579600 | B | 4/2011 | |
| CN | 102000490 | A * | 4/2011 | ............ B01D 53/78 |
| CN | 102012034 | A | 4/2011 | |
| CN | 101456541 | B | 5/2011 | |
| CN | 101576261 | B | 5/2011 | |
| CN | 101579602 | B | 5/2011 | |
| CN | 102061206 | A | 5/2011 | |
| CN | 101274204 | B | 6/2011 | |
| CN | 101670231 | B | 8/2011 | |
| CN | 201912884 | U | 8/2011 | |
| CN | 201912885 | U | 8/2011 | |
| CN | 201944861 | U | 8/2011 | |
| CN | 201949808 | U | 8/2011 | |
| CN | 102205202 | A | 10/2011 | |
| CN | 102380305 | A | 3/2012 | |
| CN | 102381685 | A | 3/2012 | |
| CN | 102381686 | A | 3/2012 | |
| CN | 102423597 | A | 4/2012 | |
| CN | 101791517 | B | 5/2012 | |
| CN | 102451604 | A | 5/2012 | |
| CN | 101574614 | B | 7/2012 | |
| CN | 101637685 | B | 7/2012 | |
| CN | 102631827 | A | 8/2012 | |
| CN | 202460375 | U | 10/2012 | |
| CN | 202460420 | U | 10/2012 | |
| CN | 202460438 | U | 10/2012 | |
| CN | 101530727 | B | 11/2012 | |
| CN | 101955828 | B | 11/2012 | |
| CN | 102211762 | B | 11/2012 | |
| CN | 101972592 | B | 12/2012 | |
| CN | 202538627 | U | 12/2012 | |
| CN | 101934191 | B | 1/2013 | |
| CN | 102049186 | B | 1/2013 | |
| CN | 202725003 | U | 2/2013 | |
| CN | 202751942 | U | 2/2013 | |
| CN | 202754802 | U | 2/2013 | |
| CN | 202829575 | U | 3/2013 | |
| CN | 101418246 | B | 4/2013 | |
| CN | 202912691 | U | 5/2013 | |
| CN | 202924730 | U | 5/2013 | |
| CN | 202953829 | U | 5/2013 | |
| CN | 102381687 | B | 8/2013 | |
| CN | 203159221 | U | 8/2013 | |
| CN | 203264545 | U | 11/2013 | |
| CN | 203291675 | U | 11/2013 | |
| CN | 102489140 | B | 12/2013 | |
| CN | 103418223 | A | 12/2013 | |
| CN | 203329558 | U | 12/2013 | |
| CN | 203612955 | U | 5/2014 | |
| CN | 102942162 | B | 8/2014 | |
| CN | 203781842 | U | 8/2014 | |
| CN | 102910593 | B | 9/2014 | |
| CN | 102847431 | B | 10/2014 | |
| CN | 103204477 | B | 10/2014 | |
| CN | 103446859 | B | 10/2014 | |
| CN | 104138713 | A | 11/2014 | |
| CN | 103301732 | B | 1/2015 | |
| CN | 103041679 | B | 2/2015 | |
| CN | 103301736 | B | 2/2015 | |
| CN | 104368231 | A | 2/2015 | |
| CN | 204134465 | U | 2/2015 | |
| CN | 204151066 | U | 2/2015 | |
| CN | 102895870 | B | 3/2015 | |
| CN | 102923670 | B | 3/2015 | |
| CN | 204198421 | U | 3/2015 | |
| CN | 103223292 | B | 4/2015 | |
| CN | 104555939 | A | 4/2015 | |
| CN | 204233957 | U | 4/2015 | |
| CN | 103112831 | B | 5/2015 | |
| CN | 104923046 | A | 5/2015 | |
| CN | 204352660 | U | 5/2015 | |
| CN | 103301705 | B | 8/2015 | |
| CN | 103482583 | B | 9/2015 | |

(56) References Cited

FOREIGN PATENT DOCUMENTS

| | | | |
|---|---|---|---|
| CN | 104927894 A | 9/2015 | |
| CN | 104941423 A | 9/2015 | |
| CN | 104946296 A | 9/2015 | |
| CN | 103463949 B | 12/2015 | |
| CN | 105110819 A | 12/2015 | |
| CN | 105126573 A | 12/2015 | |
| CN | 104353258 B | 1/2016 | |
| CN | 104249995 B | 4/2016 | |
| CN | 205235588 U | 5/2016 | |
| CN | 205245200 U | 5/2016 | |
| CN | 205252720 U | 5/2016 | |
| CN | 205252721 U | 5/2016 | |
| CN | 205252722 U | 5/2016 | |
| CN | 205262780 U | 5/2016 | |
| CN | 103822217 B | 6/2016 | |
| CN | 105757688 A | 7/2016 | |
| CN | 104555940 B | 8/2016 | |
| CN | 105841168 A | 8/2016 | |
| CN | 104524948 B | 9/2016 | |
| CN | 205549846 U | 9/2016 | |
| CN | 205562498 U | 9/2016 | |
| CN | 103521060 B | 1/2017 | |
| CN | 103939918 B | 1/2017 | |
| CN | 104208992 B | 2/2017 | |
| CN | 104258713 B | 2/2017 | |
| CN | 104528659 B | 4/2017 | |
| DE | 3733319 A1 | 9/1989 | |
| EP | 165609 B1 | 6/1985 | |
| EP | 212523 A2 | 3/1987 | |
| GB | 1 389 371 A * | 4/1975 | ........... B01D 53/501 |
| JP | S47-043737 | 11/1972 | |
| TW | 497985 | 8/2002 | |
| WO | WO200507505 A1 | 8/2005 | |
| WO | WO2005113429 A1 | 12/2005 | |
| WO | WO2006113935 A2 | 10/2006 | |
| WO | WO2012152919 A1 | 11/2012 | |

OTHER PUBLICATIONS

Shengli Cao, "Coal Chemical Product Technology," Metallurgical Industry Press (China), 43, Jun. 2003.

"Introduction to FGD for China Shenhua Coal to Liquid(CTL) Project," Jiangnan Environmental Technology, Inc., 19th Annual Electric Power Conference and Exhibition, Apr. 13, 2017, Chicago, Illinois.

"Advantages & Application of Efficient Ammonia-Based Desulfurization Technology," Jiangnan Environmental Technology, Inc., 19th Annual Electric Power Conference and Exhibition, Apr. 13, 2017, Chicago, Illinois.

Office Action issued by the Japanese Intellectual Property Office in Japanese Application No. 2017-123088, dated Apr. 16, 2018.

Google Patents English translation of CN1283346C, 2006.
Google Patents English translation of CN2640585Y, 2004.
Google Patents English translation of CN2772609Y, 2006.
Google Patents English translation of CN100428979C, 2008.
Google Patents English translation of CN201912885U, 2011.
Google Patents English translation of CN10322392A, 2013.

Office Action issued in U.S. Appl. No. 14/829,905 dated Nov. 16, 2015.

Office Action issued in U.S. Appl. No. 14/829,905 dated Feb. 29, 2016.

Office Action issued in U.S. Appl. No. 14/829,909 dated Apr. 15, 2016.

Office Action issued in U.S. Appl. No. 14/829,909 dated Dec. 14, 2016.

Office Action issued in U.S. Appl. No. 14/829,909 dated Feb. 14, 2017.

International Search Report issued for International Application No. PCT/CN2013/074657, dated Dec. 26, 2013.

International Search Report issued for International Application No. PCT/CN2014/087887, dated Jan. 14, 2015.

Supplementary European Search Report issued in European Application No. 13882863.7, dated Mar. 11, 2016.

* cited by examiner

CONTROLLING AEROSOL PRODUCTION DURING ABSORPTION IN AMMONIA-BASED DESULFURIZATION

This application claims priority under 35 U.S.C. § 119 of Chinese Patent Application No. Application No. 201911361251.1, filed on Dec. 26, 2019, which is hereby incorporated herein in its entirety.

TECHNICAL FIELD

The present disclosure relates to the technical field of environmental protection, and particularly to a method for controlling aerosol production during absorption in ammonia-based desulfurization.

BACKGROUND

Countries around the world discharge sulfur dioxide to varying extents. China's huge amount of sulfur dioxide emissions has a huge impact on the environment and society. The total amount of sulfur dioxide emissions was 19.74 million tons in 2014, 18.591 million tons in 2015, 11.029 million tons in 2016, and 8.754 million tons in 2017, causing huge economic losses and serious impacts on ecological environment and people's health in China.

Currently there are hundreds of relatively mature desulfurization technologies, among which the wet desulfurization process is the most widely used, accounting for around 85% of the total installed capacity for desulfurization in the world. Common wet flue gas desulfurization technologies include those based on limestone-gypsum, dual-alkali, sodium carbonate, ammonia, magnesia, and the like. Ammonia-based desulfurization is a wet desulfurization process using ammonia as an absorbent. This method can produce ammonium sulfate fertilizer by utilizing $SO_2$, and is an environment-friendly flue gas control scheme with low energy consumption, high added value and recycling of resources. However, in the chemical industry, there is a large amount of waste ammonia liquor generated in the production process, and therefore ammonia-based desulfurization has its unique advantages for boiler flue gas and sulfur recovery tail gas in the chemical and petrochemical industries.

The process of ammonia-based desulfurization mainly includes three procedures: absorption, oxidation, and concentration (crystallization). First, ammonium sulfite is used for absorbing sulfur dioxide to obtain a mixed solution of ammonium sulfite and ammonium bisulfate, and ammonium sulfite is obtained again after neutralization with ammonia:

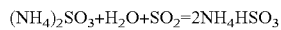

$(NH_4)_2SO_3+H_2O+SO_2=2NH_4HSO_3$

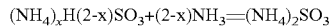

$(NH_4)_xH(2-x)SO_3+(2-x)NH_3=(NH_4)_2SO_3$

Ammonium sulfate is obtained by introducing oxidizing air into the solution to oxidize ammonium sulfite:

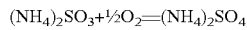

$(NH_4)_2SO_3+\frac{1}{2}O_2=(NH_4)_2SO_4$

The ammonium sulfate solution is subjected to concentration, crystallization, solid-liquid separation and drying to obtain the final product of ammonium sulfate.

The three procedures of absorption, oxidation and concentration are seemingly simple, but actually affect each other. Typically, in order to ensure absorption efficiency, the absorption liquid has included high contents of ammonium sulfite and free ammonia and low content of ammonium sulfate. While this is beneficial to absorption, it is not conducive to oxidation and concentration. The associated pH value of the absorption liquid is ~7, which leads to serious ammonia escape and aerosols during absorption.

In order to ensure absorption efficiency, the absorption temperature typically has been controlled at 30-40° C., by means of cooling with process water, providing a reheater, lowering temperature with a dilute ammonium sulfate solution, and other measures. While this is beneficial to absorption and aerosol control, it is not conducive to oxidation and concentration, and is generally used in the production of ammonium (bi)sulfite. At a low temperature, ammonium sulfite at a high concentration cannot be rapidly oxidized to form ammonium sulfate, and little water can be taken away by the flue gas. For sulfur recovery tail gas and boiler flue gas, the amount of water taken away is even less than that brought in, causing water imbalance of the system, which requires a matching evaporative crystallization process. After the absorption liquid is oxidized at a lower concentration, the product is obtained by an evaporative crystallization process, with high steam consumption, high energy consumption, lengthy process, large equipment requirements and large occupied areas, thus the operating cost is high, and the economical efficiency of the apparatus is poor.

For flue gas with water content exceeding 25%, by blending process air, nitrogen, polluted nitrogen, and carbon dioxide gas, the water content of the mixed gas is reduced, the absorption temperature is lowered, the water balance is ensured, and no waste water is generated. However, when blending with the process air, the oxygen content of the mixed process gas can sometimes exceed 15%, or even approach 20%. When the process gas is in countercurrent contact with absorption circulating liquid, the oxygen in the process gas completely oxidizes ammonium sulfite in the absorption circulating liquid to ammonium sulfate, thus the desulfurization ability of the absorption liquid is reduced. In order to ensure desulfurization efficiency, the pH of the absorption liquid is increased by adding excessive ammonia, and ammonia escape and aerosol cannot be effectively controlled. Therefore, it is of great significance to investigate the optimal combination of the process conditions and improve the method for controlling aerosol production during absorption in ammonia-based desulfurization on this basis, so as to realize the organic combination of absorption, oxidation and concentration in the ammonia-based desulfurization apparatus.

There are the following technical challenges with the ammonia-based desulfurization process for flue gas:

1. Ammonia Escape and Aerosol

Different from the limestone-gypsum method based on limestone as a raw material, as ammonia is volatile, when free ammonia is present in the absorption liquid, ammonia, $SO_2$ and $SO_3$ are simultaneously present in the gas phase. Therefore, a mist of ammonium sulfite and ammonium sulfate is readily formed, and with this mist as a core, saturated water vapor in the flue gas condenses onto the mist to form a dense white mist, causing ammonia loss on the one hand and secondary pollution on the other. This is also the first key technical challenge that has not been well-solved by the ammonia-based method for a long time in the past.

Up to now, technical suppliers of ammonia-based desulfurization apparatus are of varying qualities, the main reason for which is that the key points of researches are different. Some technical suppliers focus on how to control the production of aerosol during absorption, while others focus on how to capture the aerosol produced during absorption, rather than suppress or reduce aerosol production during absorption from its source, resulting in large system investment, high operating cost and unstable operation.

2. Oxidation of Ammonium Sulfite

The oxidation of ammonium sulfite is different from that of other sulfites. At a certain concentration, $NH_4^+$ has a damping effect on the oxidation process, and this unique property is discussed in literature (Chemical Engineering Science, 2000, which is hereby incorporated by reference herein in its entirety). $NH_4^+$ significantly hinders the dissolution of $O_2$ in aqueous solution. When the salt concentration is less than 0.5 mol/L (about 5% (wt)), the oxidation rate of ammonium sulfite increases with the increase of its concentration, whereas when this limit is exceeded, the oxidation rate decreases with the increase of the concentration. However, when the concentration of total ammonium salt is 3-4 mol/L and the concentration of ammonium sulfite is less than 0.05 mol/L, that is, when the oxidation ratio of the solution is more than 99%, the oxidation reaction is a 0-order rapid reaction, that is, the oxidation rate is independent of the content of ammonium sulfite. At this time, the concentration of ammonium sulfite in the absorption liquid is very low, so the desulfurization efficiency can only be ensured by adding more ammonia, and there is no guarantee that the ammonia escape and the total dust from the outlet flue gas meet requirements.

The oxidation reaction of ammonium sulfite can also occur during absorption. When the $O_2$ content in the flue gas is lower than 8%, the reaction rate is slow, but the oxidation ratio can still reach 40-80% under the condition of continuous circulation. When the oxygen content in the flue gas further rises above 16%, the ammonium sulfite in the absorption liquid may be completely oxidized by oxygen, and can be directly sent to a post-treatment system for processing, thus adversely affecting ammonia escape and aerosol control. In order for the unoxidized ammonium sulfite in the absorption liquid to be oxidized to ammonium sulfate, an oxidation tank/oxidation section/jet oxidizer is typically used to fully oxidize ammonium sulfite under the condition of excessive and pressurized oxidizing air. Some technical suppliers choose to add catalysts into the absorption liquid to promote oxidation, but this will affect the product quality.

This is also the second technical difficulty relative to the calcium-based method.

3. Recovery of Ammonia Entrained in Tail Gas

Unlike other alkaline substances, ammonia is volatile. In order to ensure the desulfurization efficiency and the final discharge index, in the conventional counter-current contact absorption tower, whether a spray tower, a packed tower or a plate tower, the contact point at the top of the absorption zone has the highest pH value of the solution, the gas phase has the lowest $SO_2$ concentration, and the ammonia concentration in the gas phase is the highest, which means that the amount of ammonia overflowing the desulfurization tower with the tail gas will be large. This will cause both waste loss of ammonia and new pollution.

The above challenges are an important reason why the ammonia-based method has long remained undeveloped. In view of aerosol and ammonia escape problems, well-known research institutes and engineering companies at home and abroad have proposed various solutions to control or eliminate them, such as wet electricity, multi-stage water washing, multi-stage demisting, or a combination thereof. However, these methods do not address the problems from the source of aerosol and ammonia escape during absorption, and merely focus on how to eliminate the escaped ammonia and the produced aerosol during absorption, thus making the tower sections more numerous and the system more complicated, not only the processing effect is undesirable, but also the investment and operation costs are greatly increased.

In ammonia-based desulfurization apparatus, absorption, oxidation and concentration affect each other. Absorption is favored by a high pH solution and a high content of ammonium sulfite; oxidation is favored by a relatively low concentration of total ammonium salt and a low content of ammonium sulfite; concentration is favored by a high content of ammonium sulfate; and controlling ammonia escape and aerosol is favored by a low pH solution and no free ammonia. Due to the different effects of the composition of solution in different processes, there is a great need for technologies that more reasonably control aerosol production during absorption, so as to achieve the coordinated control of absorption, oxidation and concentration, and while meeting discharge standards, reducing cost, simplifying processes, and reducing difficulty of operation.

A Chinese patent for invention with application number CN02136906.2 proposed a method and an apparatus for removing and recovering $SO_2$ in flue gas, wherein the concentration of ammonium sulfite is controlled at 0.1-5% (wt), preferably 0.5-2.0%, so as to create the most favorable conditions for oxidation, reduce the energy consumption and investment of oxidation, and ensure a high desulfurization efficiency. The absorption liquid has an ammonia/sulfur ratio=1.3-1.8 (molar ratio), and the absorption gas/liquid ratio is 2,000-5,000 (volume ratio). The ammonium sulfate solution is concentrated by using the heat of hot flue gas, whereby the temperature of the hot flue gas is reduced to 50-55° C., ammonium sulfate can be concentrated to 40-50% (wt) and sent to ammonium sulfate crystallizer to be processed into commercial ammonium sulfate fertilizer. The oxidation section is provided with a longitudinal partition plate to separate the solution of unoxidized ammonium sulfite from the solution of oxidized ammonium sulfate as much as possible without back mixing. This method has several characteristics, such as that 1) the concentration of the absorption liquid is low, and it is only suitable for low sulfur-containing flue gas; 2) the control of ammonia escape and aerosol production during absorption is not a concern, and it is necessary to provide a reheater to eliminate white smoke; and 3) crystallization is affected by dry air volume and dust content, and the amount of crystallization is small and unstable.

A Chinese patent for invention with application number CN201510680578.0 proposed an ammonia-based dual-cycle desulfurization-denitrification-dust removal system, comprising a washing absorption tower (1) and an oxidation circulation tank (9); the washing absorption tower (1) consists in turn of a high-efficiency water mist removal section (2), an enhanced ammonia mist removal section (3), an absorption liquid demisting section (4), a secondary absorption section (5), a primary absorption section (6) and a washing and cooling section (7); when the flue gas enters the primary absorption section (6), an ammonium sulfate solution that has a density of 1.1-1.15 kg/L, a pH value of 6.5-7 and contains ammonium nitrate is used as absorption liquid to mainly remove $SO_2$; and when the flue gas enters the secondary absorption section (5), an ammonium sulfate solution that has a density of 1.05-1.1 kg/L, a pH value of 5.5-6 and contains ammonium nitrate is used as absorption liquid to assist in $SO_2$ removal. The process is complicated, involves excessive ammonia, causes serious aerosol and ammonia escape during absorption, and it is difficult to ensure the final discharge index by water washing and demisting.

A Chinese patent for invention with application number CN201611014433.8 proposed a method for reducing aerosol production in ammonia-based desulfurization, which includes the following specific steps: 1) ammonia liquor is driven into the ammonia absorption tower, and a primary absorption circulating pump is started for spray washing to desulfurize most $SO_2$ in the flue gas; 2) ammonia liquor is driven into the ammonia absorption tower for spray washing, such that the spray liquid further reacts with $SO_2$ in the flue gas to remove pollutants therefrom; 3) the flue gas after secondary absorption passes through a water washing and spraying device to wash the aerosol and other impurities entrained in the flue gas; and 4) finally, the flue gas is washed with water and passes through a defrother to remove the impurities such as liquid foam and residual aerosol entrained during washing and spraying, the purified tail gas is up to standards and is discharged. In step 1), the pH value of the absorption liquid is strictly controlled at 5.5-6.5, and the density is 1.15-1.25 g/ml. In step 2), the pH value of the absorption liquid is strictly controlled at 5.0-6.0, and the density is 1.0-1.20 g/ml. The composition of the solution and the absorption temperature are not specified in this process, and ammonia escape and aerosol production still cannot be adequately controlled from the source. Moreover, the flue gas after simple water washing and demisting still cannot meet the requirements of China's ultra-low discharge standards or higher.

A Chinese patent for invention with application number CN201611207184.4 proposed a process for saving water and controlling aerosol phenomenon in ammonia-based desulfurization process, wherein boiler flue gas enters into a desulfurization tower, and $SO_2$-containing flue gas entering into the desulfurization tower is sprayed with a spray liquid of ammonium sulfate/ammonium sulfite solution with a concentration of 5-35%, then passes through a filler layer and contacts with cooling water above the filler layer, and then contacts with a water washing and spraying layer, whereby the cooling water at the bottom of the filler layer falls onto a water washing liquid accumulation tray and flows back to a cooling water tower, then enters a water washing tank and is driven by a washing water delivery pump to the water washing and spraying layer for recycling; the system has simple system flow, good cooling, low operation cost and the like; the spray cooling water absorbs substances such as $(NH_4)_2SO_4$ particles, $SO_2$, and $NH_3$ in the boiler flue gas, saturated water vapor in the boiler flue gas condenses with $(NH_4)_2SO_4$ particles as cores to form water droplets, so that the $(NH_4)_2SO_4$ particles in the boiler flue gas are captured, the formation of aerosol is suppressed, and the particle concentration in the boiler flue gas discharged in the ammonia-based desulfurization process is made to be less than 30 mg/$Nm^3$. The solution composition, pH value and absorption temperature are not specified in this process, and the ammonia escape and aerosol production still cannot be completely controlled from the source. Moreover, the energy consumption of low-temperature water washing is high, and the particle concentration in the purified flue gas is less than 30 mg/$Nm^3$, which does not meet the latest discharge standards.

A Chinese patent for invention with application number CN201310340885.5 proposed a method for controlling aerosol discharge in ammonia-based desulfurization and a special absorption tower therefor, wherein the flue gas is cooled to 100-120° C. by spraying with atomized water and cooling, and is introduced into a desulfurization zone of a desulfurization absorption tower, where the flue gas from bottom up contacts countercurrently with the desulfurization liquid sprayed from top down, so that $SO_2$ in the flue gas is absorbed; fillers or sieve plates are provided within the desulfurization zone; desulfurized flue gas enters a filler washing zone, into which washing water is injected to remove coarse-grained aerosol produced in the ammonia-based desulfurization; after desulfurization and coarse-grained aerosol removal, the flue gas enters a water vapor phase transition zone, and steam is injected from the middle of the water vapor phase transition zone to establish a supersaturated water vapor environment required for water vapor phase transition, so that fine-grained aerosol particles which are not removed condense and grow up, and are removed by a screen demister at the flue gas outlet of the water vapor phase transition zone; the purified flue gas is discharged via a chimney from the flue gas outlet at the top of the desulfurization absorption tower. The superficial gas flow rate of the flue gas is 2.0-3.0 m/s, the operating liquid-gas ratio is 2-8 L/$Nm^3$, the pH value of the desulfurization liquid is 5.2-6.0, and the temperature of the desulfurization liquid is 45-55° C.; the desulfurizer in the desulfurization liquid is ammonium sulfate or ammonium sulfite, with a concentration of 10% wt to supersaturation; the washing water spraying and liquid-gas ratio in the filler washing zone is 0.6-3.0 L/$Nm^3$, the temperature of the flue gas after washing through the filler layer is reduced to 50-55° C. In an embodiment, the lowest mass concentration of $PM_{10}$ at the outlet of the absorption tower is 45 mg/$Nm^3$, and the lowest $SO_2$ concentration is 135 mg/$Nm^3$. This process still cannot adequately control ammonia escape and aerosol production from the source, the particles and $SO_2$ in the purified flue gas do not meet the latest discharge standards, and the energy consumption of steam phase transition is high.

A Chinese patent for invention with application number CN201710800599.0 proposed a method for controlling aerosol production during absorption in ammonia-based desulfurization, which uses an absorption circulating liquid containing ammonium sulfite to remove sulfur dioxide in the flue gas, so as to control aerosol production during absorption in ammonia-based desulfurization. High-efficiency desulfurization and dust removal are realized by staged solution composition control and reaction condition control, and while carrying out the high-efficiency desulfurization, ammonia escape and aerosol production during absorption are controlled; the flue gas after preliminary cooling and purification contacts sequentially with an absorption circulating liquid and a fine particle washing circulating liquid, and the solution composition of each stage and reaction temperature are controlled, so that the coordinated control of absorption, oxidation and concentration is achieved. This process does not specify the methods for controlling the oxygen content of the flue gas and controlling the absorption temperature as well as the treatment of absorption wastewater. It still needs to be further developed to specify the process control indexes and control methods, so as to provide support for controlling aerosol production during absorption in ammonia-based desulfurization from the source.

Typical approaches do not fully grasp the key technology of ammonia-based desulfurization, does not implement the control of aerosol production from the source, fails to implement the coordinated control of absorption, oxidation, and concentration, does not solve the major technical challenges of ammonia escape and aerosol from the source thereof, only pays attention to the way of eliminating the escaped ammonia and the aerosol produced during absorption, thus making the tower sections more numerous and the system more complicated, and not only the processing effect is undesirable, but also the investment and operation costs are greatly increased.

It would therefore be desirable to provide apparatus and methods for controlling, at the source, ammonia escape and aerosol production.

REFERENCE NUMERALS

Figure 1:
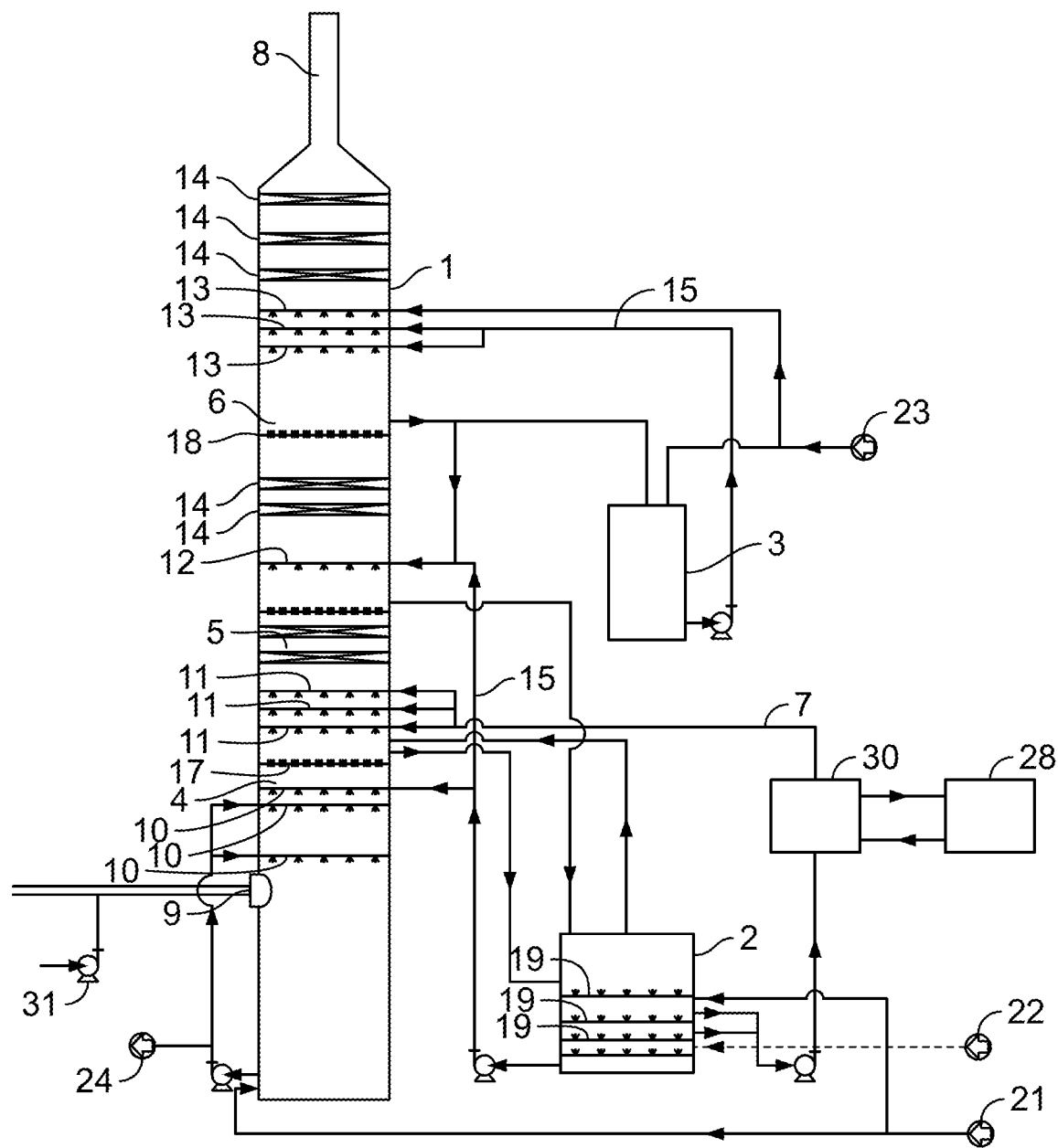
FIG. 1 is a schematic diagram of a method and an apparatus in accordance with the principles of the invention.

1 Absorption tower
2 Oxidation device
3 Fine particle washing circulating tank
4 Pre-wash zone
5 Absorption zone
6 Fine particle control zone
7 Absorption circulating liquid
8 Purified flue gas outlet
9 Process gas
10 Pre-wash spraying layer
11 Absorption spraying layer
12 Fine particle spraying layer a
13 Fine particle spraying layer b
14 Demister
15 Fine particle circulation washing liquid
16 Absorption circulating tank
17 Gas-liquid separator a
18 Gas-liquid separator b
19 Gas-liquid dispersion intensifier
20 Pre-wash circulating liquid
21 Ammonia
22 Oxidizing air
23 Process water
24 Ammonium sulfate post-treatment system
25 Evaporative crystallization system
26 Steam condensate
27 Steam condensate treatment device
28 Circulating water system
29 Pre-wash zone heat exchange device
30 Absorption zone heat exchange device
31 Process blower
32 Solid-liquid separation device
33 Centrifuge
34 Integrated drying tower
35 Packaging machine
36 Ammonium sulfate finished product
37 Vapor condensate treatment dilute solution
38 Vapor condensate treatment concentrated solution

DETAILED DESCRIPTION

Definitions

"Ammonia-Bearing Liquid" means a liquid comprising at least one ammonia or amine based compound, including but not limited to ammonium salts, ammonium ions (NH4+), ammonium sulfate, ammonium sulfite, and any combination thereof. The liquid may be water.

"Ammonia Escape" means ammonia or one or more ammonia/amine bearing species that escape with exhaust.

"Ammonia recovery" means that fraction or percentage of ammonia added to a gas cleaning process that is subsequently captured and extracted from the process. The species are derived from ammonia or ammonia/amine bearing species that are added to the gas flow to absorb sulfur.

"Dust" means a particulate material fine enough to waft along gaseous flows, when handled, processed, or contacted. It includes but is not limited to aerosols, including solid aerosol particles and liquid aerosol particles, soot, charcoal, non-combusted coal, fine minerals, sand, gravel, salts, and any combination thereof.

"Exhaust" means a flow of gas exiting an industrial or chemical process. It includes but is not limited to flue gas, tail gas, exhaust gases from ovens, furnaces, boilers, and/or generators. It may comprise combustion products derived from the combustion of air and flammable material, residual material from chemical processes, which may include water, nitrogen, and pollutants, such as particulate matter, soot, carbon monoxide, nitrogen oxides, and sulfur oxides. The exhaust of one process may be a gaseous input to another process.

"Spray Coverage" is a divergence of spray from a nozzle or an array of nozzles. The greater is the divergence, the greater is the spray coverage.

Percent-content: Volume-percent (v/v), unless stated otherwise herein.

In the event that the above definitions or a description stated elsewhere in this application is inconsistent with a meaning (explicit or implicit) that is commonly used, set forth in a dictionary, or stated in a source incorporated by reference into this application, the application and the claim terms in particular are understood to be construed according to the definition or description in this application, and not according to the common definition, dictionary definition, or the definition that was incorporated by reference. In the event that a claim term can only be understood if it is construed by a dictionary, a definition set forth in the Kirk-Othmer Encyclopedia of Chemical Technology, 5th Edition, 2005, (John Wiley & Sons, Inc.), which is hereby incorporated by reference herein in its entirety, shall control, if provided therein.

Apparatus and Methods

Apparatus and methods for absorption of sulfur dioxide from a flue gas are provided.

The absorption liquid may include ammonium sulfite. The absorption liquid may remove sulfur dioxide from the flue gas. Ammonia-based desulfurization may be carried out after ammonia is added into circulating absorption and converted to ammonium sulfite. Oxygen content and water content of the process gas may be controlled. The absorption temperature may be controlled. Staged solution composition control and reaction condition control may be utilized.

Coordinated use of the foregoing techniques in accordance with the principles of the invention may be used to inhibit aerosol production during absorption in ammonia-based desulfurization. Such use may avoid or reduce the need to capture ammonia, introduced into flue gas to absorb sulfur, after the sulfur is absorbed. Such use may avoid the need for ammonia capture, post-sulfur absorption by techniques such as wet electricity, multi-stage water washing, multi-stage demisting, or the like, or a combination thereof. Such use may coordinate absorption, oxidation and concentration. It may simplify flue gas treatment process flow and reduce implementation cost.

The apparatus may include a reactor. The reactor may be configured to receive the flue gas. The apparatus may include a spraying layer. The spraying layer may be disposed in the reactor. The spraying layer and may be configured to contact the flue gas with an ammonia-bearing liquid that that contains ammonium sulfite and absorbs, at a temperature, sulfur from the flue gas. The apparatus may include a control. The control may be configured to limit oxygen content of material entering the reactor to a content that is no greater than 12% by volume. The control may be configured to lower the temperature in response to an excess aerosol content in effluent from the reactor. The apparatus may include an oxidation system. The oxidation system may be configured to oxidize the liquid. The apparatus may include an auxiliary system. The auxiliary system may be configured to derive ammonium sulfate solid from the liquid.

The auxiliary system may include an ammonium sulfate post-treatment system.

The auxiliary system may include an ammonia supply system.

The auxiliary system may include a process water system.

The reactor may include an absorption tower in which may be defined a pre-wash zone. The reactor may include an absorption tower in which may be defined an absorption zone.

The reactor may include an absorption tower in which may be defined a fine particle control zone.

Each of the zones may include one or more spraying layer.

A gas-liquid separator may be disposed between the absorption zone and the pre-wash zone.

A gas-liquid separator may be disposed between the absorption zone and the fine particle control zone.

A gas-liquid separator may be disposed within the absorption zone.

A gas-liquid separator may be disposed within the fine particle control zone.

The apparatus may include, in each of the fine particle control zone, pre-wash zone and absorption zone, a demister layer.

The demister may include a structure selected from the group consisting of: baffle, ridge, filler and screen mesh, or a combination thereof.

In the absorption zone, in each layer, a liquid-gas ratio may be a ratio that is not less than 0.4 L/Nm$^3$.

In the absorption zone, in each layer, an average spray coverage rate may be a rate that is not less than 200%.

In the fine particle control zone, in each layer, a liquid-gas ratio may be a ration that is not less than 0.42 L/Nm$^3$. In the fine particle control zone, in each layer, an average spray coverage rate may a rate that is not less than 150%.

In each layer of the absorption zone, a total area having a spray coverage rate of less than 200% may be an area that is not more than 10% of a cross-sectional area of the absorption tower.

In each layer of the fine particle control zone, a total area having a spray coverage rate of less than 200% may be an area that is not more than 10% of a cross-sectional area of the absorption tower.

In each layer of the fine particle control zone, a total area having a spray coverage rate of less than 200% may be an area that is not more than 5% of a cross-sectional area of the absorption tower.

The oxidation system may include an oxidation tank. The tank may be configured to receive used absorption liquid. The tank may be configured to flow a first fraction of the used absorption liquid through a first path. The tank may be configured to flow a second fraction of the absorption liquid through a second path. The tank may be configured to provide, from the first path, a first output to the fine particle control zone from the second path, a second output to the absorption zone.

The first output may be more oxidized than the second output.

The oxidation tank may include an array of gas-liquid dispersion intensifiers/

The oxidation tank may include a first output port. The first output port may be disposed at a first location along the array. The first output port may be configured to provide the first output. The oxidation tank may include a second output port. The second output port may be disposed at a second location along the array. the second output port may be configured to provide the second output. The second location may cause less oxidation of the used absorption liquid than the first location causes.

The oxidation tank may include an ammonia chamber that may define perforations for passage of ammonia from the chamber to the first path. The oxidation tank may include an ammonia chamber that may define perforations for passage of used absorption liquid into the chamber.

The oxidation tank may include an ammonia chamber that may define perforations for passage of ammonia from the chamber to the second path. The oxidation tank may include an ammonia chamber that may define perforations for passage of used absorption liquid into the chamber.

The oxidation tank may include a separator. The oxidation tank may include, in the first path, an oxidized air source. The second path may pass outside the separator.

The second path may be a path along which no oxidized air is provided.

The used absorption liquid at the first output may be fully oxidized.

The control may be configured to lower a pH of the used absorption liquid at the first output in response to an excess aerosol content in effluent from the reactor.

The separator may define perforations. The perforations may be configured to pass used absorption liquid from the first path to the second path. The perforations may be configured to pass used absorption liquid from the second path to the first path.

The tower may be configured to flow the flue gas at a superficial gas flow rate of 0.8 m/s-4 m/s.

The tower may be configured to receive flue gas having an $SO_2$ concentration of up to 30,000 mg/Nm$^3$.

The tower may be configured to emit effluent having an $SO_2$ content that may be a content that is not more than 400 mg/Nm$^3$.

The effluent may have an $SO_2$ content that is not more than 100 mg/Nm$^3$.

The effluent may have an $SO_2$ content that is not more than 35 mg/Nm$^3$.

The effluent may have an $SO_2$ content that is not more than 10 mg/Nm$^3$.

The tower may be configured to emit effluent having a total dust content, including aerosol, that is not more than 50 mg/Nm$^3$.

The total dust content may be a content that is not more than 20 mg/Nm$^3$.

The total dust content may be a content that is not more than 5 mg/Nm$^3$.

The total dust content may be a content that is not more than 3 mg/Nm$^3$.

The tower may be configured to emit effluent having an ammonia escape that is not more than 8 mg/Nm$^3$.

The tower may be configured to emit effluent having an ammonia escape that may be an escape that is not more than 4 mg/Nm$^3$.

The tower may be configured to emit effluent having an ammonia escape that may be an escape that is not more than 2 mg/Nm$^3$.

The tower may be configured to emit effluent having an ammonia escape that may be an escape that is not more than 1 mg/Nm$^3$.

The apparatus may include an additive gas source that may be configured to flow additive gas into the flue gas before the flue gas enters the tower, a mixture of the additive gas and the flue gas being process gas and having, at an inlet of the tower, a water content that exceeds 15%. The apparatus may include an evaporative crystallization system configured to crystallize ammonium sulfate from absorbed $SO_2$ after absorption of $SO_2$ in the ammonia-bearing liquid.

The evaporative crystallization system may be configured to perform a dual-effect evaporative crystallization process. The apparatus may include a steam jet pump that may be part of the dual-effect evaporative crystallization process. The evaporative crystallization system may be configured to perform a single-effect evaporative crystallization process. The evaporative crystallization system may be configured to perform an MVR evaporative crystallization process.

The apparatus may include an additive gas source that may be configured to flow additive gas into the flue gas before the flue gas enters the tower, a mixture of the additive gas and the flue gas being process gas having, at an inlet of the tower, a water content that exceeds 15%. The apparatus may include a heat exchanger configured to exchange heat with pre-wash fluid before the pre-wash fluid may be sprayed in the pre-wash zone.

The apparatus may include an evaporative crystallization system configured to crystallize ammonium sulfate from absorbed $SO_2$ after absorption of $SO_2$ in the ammonia-bearing liquid.

The apparatus may include an additive gas source that may be configured to flow additive gas into the flue gas before the flue gas enters the tower, a mixture of the additive gas and the flue gas being process gas having, at an inlet of the tower, a water content that exceeds 15%. The apparatus may include a heat exchanger configured to exchange heat with the ammonia-bearing liquid before the ammonia-bearing liquid may be sprayed in the absorption zone. The apparatus may include an evaporative crystallization system configured to crystallize ammonium sulfate from absorbed $SO_2$ after absorption of $SO_2$ in the ammonia-bearing liquid.

The apparatus may include an additive gas source that may be configured to flow additive gas into the flue gas before the flue gas enters the tower, a mixture of the additive gas and the flue gas being process gas having, at an inlet of the tower, a water content that exceeds 15%. The apparatus may include a heat exchanger configured to exchange heat with the ammonia-bearing liquid before the ammonia-bearing liquid may be sprayed in the absorption zone. The apparatus may include a heat exchanger configured to exchange heat with pre-wash fluid before the pre-wash fluid may be sprayed in the pre-wash zone. The apparatus may include an evaporative crystallization system configured to crystallize ammonium sulfate from absorbed $SO_2$ after absorption of $SO_2$ in the ammonia-bearing liquid.

The apparatus may include a steam condensate treatment device. The condensate treatment device may include a membrane separation device. The condensate treatment device may include a deaerator. The condensate treatment device may include a clear-liquid outlet. The condensate treatment device may include a concentrated-liquid outlet The clear-liquid outlet of the steam condensate concentration device may be in fluid communication with a circulating water system.

The concentrated liquid outlet may be in fluid communication with fine particle control zone.

The apparatus may include a circulating water system. The circulating water system may be configured to transport steam condensate from the evaporative crystallization system to the absorption tower.

The apparatus may include an air distribution device. The air distribution device may be configured to flow air into the flue gas, to form process gas, before the flue gas enters the tower. The air distribution device may be configured limit an oxygen content of the process gas, downstream of the air distribution device and upstream of the tower, to no greater than 12% by volume. The flue gas, prior to mixing with the air, may have a water content that exceeds 15% by volume.

The oxygen content may be an oxygen content that is not greater than 10%. The oxygen content may be in the range 3-9%.

The apparatus may include a condensation device. The condensation device may be configured to cool the process gas. The condensation device may be configured to reduce a humidity of the process gas.

The apparatus may include an air distributor in fluid communication with the flue gas. The apparatus may include a pre-wash zone heat exchanger configured to cool pre-wash circulating liquid entering the tower. The air distributor may be configured to maintain a water content of the process gas at no more than 10% by volume when the flue gas may has water content that exceeds 18% by volume.

The apparatus may include an absorption zone heat exchanger. The absorption zone heat exchanger may be configured to cool absorption liquid entering the tower. The air distributor may be configured to maintain a water content of the process gas at no more than 10% by volume when the flue gas has a water content that exceeds 18% by volume.

The pre-wash zone heat exchange device and/or the absorption zone heat exchange device may include a tubular heat exchanger, an evaporative cooler, an air cooler and a plate heat exchanger; the plate heat exchanger may be appropriate in areas where circulating water/primary water may be abundant, and air cooler may be appropriate in areas where the average temperature in summer may be ≤30° C.

The methods may include methods for absorption of sulfur dioxide from a flue gas.

The methods may include flowing the flue gas through a reactor. The methods may include, in the reactor, absorbing at a temperature, in an ammonia-bearing, circulating liquid that contains ammonium sulfite, sulfur from the flue gas. The methods may include collecting the liquid.

The methods may include limiting oxygen content of material entering the reactor to a content that may be no greater than 12% by volume. The methods may include, responsive to an excess aerosol content in effluent from the reactor, lowering the temperature.

The methods may include, before the flowing, mixing air with the flue gas to form process gas.

The lowering may include lowering a temperature of the air.

The lowering may include lowering a temperature of the liquid.

The lowering a temperature of the liquid may include passing the liquid through a circulating water cooler.

The methods may include providing cooling water to the water cooler. The methods may include, in response to an excess ion condition in the cooling water. The methods may include replacing a fraction of the cooling water with process water.

The replacing may include obtaining process water from a steam condensate treatment system that may be configured to derive steam from an ammonium sulfate slurry.

The methods may include crystalizing ammonium sulfate in the liquid by transferring heat from the flue gas to the liquid.

The lowering a temperature of the liquid may include increasing a flow rate of the air. The lowering a temperature of the liquid may include reducing a humidity of the air.

The methods may include flowing a fraction of the liquid into an oxidation system. The methods may include oxidizing, in the oxidation system, ammonium sulfite in the liquid.

The methods may include returning the liquid to the reactor.

The lowering may lower the temperature to a value that may be within the range 30 to 60° C.

The range may be 35-56° C.
The range may be 40-55° C.
The range may be 45-53° C.

The limiting may limit the oxygen content to a content that may be no greater than 10%. The limiting may limit the oxygen content to a content in the range 3 to 9%. The limiting may limit the oxygen content to a content that may be no greater than 8%

The absorbing may include providing the ammonia-bearing liquid in stages having different compositions. The absorbing may have an absorption temperature and an absorption oxygen content that are controlled such that no less than 90% of the sulfur dioxide may be removed from the flue gas. The absorbing may have an absorption temperature and an absorption oxygen content that are controlled such that dust content of effluent from the reactor is no greater than 50 mg/Nm$^3$.

The process gas may include a water content that may be no greater than 25%.

The water content may be no greater than 18%.
The water content may be in the range 4 to 15%.

The methods may include, using the stages, controlling a gradient of ammonium sulfite. The methods may include, using the stages, controlling a gradient of ammonium bisulfite. The methods may include, using the stages, controlling a gradient of ammonium sulfate. The methods may include, prior to the absorbing, mixing air with the flue gas to form process gas. The methods may include, prior to the absorbing, cooling and purifying the process gas. The methods may include contacting the process gas with the ammonia-bearing liquid, in one or more of the stages that includes ammonium sulfite and ammonium sulfate, then, a fine particle washing circulating liquid, in one or more of the stages that includes ammonium sulfite and ammonium sulfate. The stages; the cooling and purifying. the contacting may act together to absorb the no less than 90% of the sulfur dioxide.

The methods may include adjusting a ratio of flue gas to air to control oxygen content of the process gas to a level no greater than 12%.

The methods may include adding dry air to the flue gas to reduce a water content in the effluent.

The fine particle washing circulating liquid may have a pH value that is lower than that of the absorption circulating liquid. The fine particle washing circulating liquid may have an ammonium sulfite content that is less than that of the ammonia-bearing liquid.

The providing may include selecting, based on: a measured sulfur dioxide concentration of the flue gas. an export emission index; a number of stages to apply.

The number may be greater than two. The composition of a stage may include 0.15-4.95% ammonium sulfite. The composition of a stage may include 5-38% ammonium sulfate. The stages may include an upper absorption circulating liquid. The stages may include a lower absorption circulating liquid. The upper absorption circulating liquid may have an ammonium sulfite content is be lower than that of the lower absorption circulating liquid. The upper absorption circulating liquid may have a pH value that is lower than that of the lower absorption circulating liquid.

The providing may include selecting, based on: a measured sulfur dioxide concentration of the flue gas. an export emission index, a number of stages to apply. The number may be greater than two. The composition of a stage may include 0.15-4.95% ammonium sulfite. The composition of a stage may include 5-38% ammonium sulfate.

The stages may include an upper absorption circulating liquid. The stages may include a lower absorption circulating liquid. The upper absorption circulating liquid may have a pH value that is lower than that of the lower absorption circulating liquid.

The upper absorption circulating liquid may have a pH value that is lower than that of the lower absorption circulating liquid.

The number of stages may be no more than two. The number may be no more than 1.

A stage of the stages may include a fine particle washing circulating liquid having a composition that includes 0.003-1% ammonium sulfite. A stage of the stages may include a fine particle washing circulating liquid having a composition that includes 0.3-38% ammonium sulfate. A stage of the stages may include a fine particle washing circulating liquid that has a pH value in the range 1-6.

The fine particle washing circulating liquid may include 2 stages. At least one of the stages may include ammonium sulfite in the range 0.1-1%. At least one of the stages may include ammonium sulfate in the range 5 to 38%.

The methods may include, when the flue gas may have a water content greater than 15% reducing the water content to a water content in the range 8 to 13% by adding to the flue gas a dry gas having a water vapor volume content no greater than 5%. The methods may include, when the flue gas may have a water content greater than 15% limiting the oxygen content to be no more than 12%.

The dry gas may include air. The dry gas may include nitrogen. The dry gas may include polluted nitrogen. The dry gas may include carbon dioxide gas.

Illustrative Embodiments-I

1. The gas purification process may include an absorption cycle and a fine particle washing cycle, and the circulating liquid in the gas purification process may include an absorption circulating liquid and a fine particle washing circulating liquid. The absorption circulating liquid may be mainly used for desulfurization and controlling aerosol production during the desulfurization, and the fine particle washing circulating liquid, while further favoring desulfurization efficiency, may limit fine particles in the process gas, and may ensure that the discharge of particles and free ammonia may is compliant with standards.

2. The reaction conditions may be controlled: the pH value of the absorption circulating liquid may be reduced, and the pH value may be controlled below 6.6; the absorption temperature may be controlled at 30-60° C., the oxygen content of the process gas may be controlled below 12%, and the water content may be controlled below 25%, so as to minimize the ammonia escape and aerosol production during absorption, and at the same time reduce energy consumption, avoid waste water discharge, and realize the long-term stable operation of the apparatus.

3. The content of ammonium (bi)sulfite in the absorption circulating liquid may be controlled to control the aerosol production during absorption and create the most favorable conditions for oxidation, reduce the energy consumption and investment of oxidation, and reduce the oxidation of the absorption circulating liquid during absorption.

4. The heat of the flue gas may be reasonably utilized to concentrate the ammonium sulfate solution and increase the content of ammonium sulfate in the absorption circulating liquid, generally above 5%, and preferably between 15-35%, so as to create favorable conditions for concentration while favoring absorption efficiency and controlling aerosol production. Flue gas having an $SO_2$ concentration below 10,000 mg/Nm3 or water content below 12% only needs saturated crystallization, and for flue gas with a higher $SO_2$ concentration, part of the solution may be sent to an evaporative crystallization device for treatment, so as to reduce the investment and energy consumption of ammonium sulfate post-treatment system. When the water content in the flue gas exceeds 15%, an air distribution system, a pre-wash zone cooling device, an absorption zone cooling device, an evaporative crystallization system and a steam condensate treatment system may be included.

5. The oxidation system may be provided in layers or by devices according to the desired solution composition control, and the fine particle washing circulating liquid and the absorption circulating liquid may be taken out at different positions or from different devices of the oxidation devices of the oxidation system.

Through industrious work, the inventors have found that a way to realize reduced aerosol production is to control aerosol production during absorption, the control means including but not limited to accurately controlling the solution composition, oxygen content and absorption temperature by zones. The oxygen content of the process gas may be ≤12%, and the absorption temperature may be 30-60° C. The absorption circulating liquid may be provided with one or more stages as required, wherein at least one stage contains ammonium sulfite and ammonium sulfate, and the fine particle washing circulating liquid may be provided with one or more stages as required, wherein at least one stage contains ammonium sulfite and ammonium sulfate. The pH value of the fine particle washing circulating liquid may be lower than that of the absorption circulating liquid, and the ammonium sulfite content may be less than that of the absorption circulating liquid. The absorption temperature may be controlled to be within a suitable range to reduce energy consumption while ensuring absorption efficiency, controlling ammonia escape and aerosol.

The absorption temperature may be lowered by conventional means such as cooling with process water and blending cold gas, and increased by conventional means such as blending hot gas and humidifying.

Illustrative Embodiments-II

In a method for controlling aerosol production during absorption in ammonia-based desulfurization, the absorption reaction temperature may be controlled at 30-60° C., the oxygen content of the process gas may be controlled ≤12%, and an absorption circulating liquid containing ammonium sulfite may be used for removing sulfur dioxide in flue gas. High-efficiency desulfurization and dust removal may be realized by staged solution composition control and reaction condition control, and while carrying out the high-efficiency desulfurization and dust removal, ammonia escape and aerosol production may be controlled. The staged solution composition control may include concentration gradient control of ammonium sulfite, ammonium bisulfate, ammonium sulfate or a combination thereof.

The temperature of absorption reaction may be 35-56° C., preferably 40-55° C., and most preferably 45-53° C.

The oxygen content of the process gas may be ≤12%, preferably ≤10%, and more preferably 3-9%.

The water content of the process gas may be ≤25%, preferably ≤18%, and more preferably 4-15%.

The flue gas after preliminary cooling and purification may contact sequentially with an absorption circulating liquid and a fine particle washing circulating liquid to realize the coordinated control of absorption, oxidation and concentration. The absorption circulating liquid may be provided with one or more stages as required, wherein at least one stage may contain ammonium sulfite and ammonium sulfate, and the fine particle washing circulating liquid may be provided with one or more stages as required, wherein at least one stage may contain ammonium sulfite and ammonium sulfate. The pH value of the fine particle washing circulating liquid may be lower than that of the absorption circulating liquid, and the ammonium sulfite content may be less than that of the absorption circulating liquid.

When multi-stage absorption circulating liquid is chosen, the composition of at least one stage may include 0.15-4.95% ammonium sulfite and 5-38% ammonium sulfate, and the pH value may be 4.5-6.5. The ammonium sulfite content of the upper absorption circulating liquid may be lower than that of the lower absorption circulating liquid, and/or the pH value of the upper absorption circulating liquid may be lower than that of the lower absorption circulating liquid. The absorption circulating fluid may have 1-2 stages, preferably one stage. The mass fraction ratio of ammonium sulfate to ammonium (bi)sulfite in at least one stage of absorption circulating liquid may be 1.5-199:1.

The composition of at least one stage of the fine particle washing circulating liquid may include 0.003-1% ammonium sulfite and 0.3-38% ammonium sulfate, and the pH value may be 1-6. Preferably there may be 2 stages, at least one of which may contain ammonium sulfate with high concentration, wherein ammonium sulfite may be 0.01-1%, and ammonium sulfate may be 5-38%. The washing temperature may be 28-68° C., preferably 30-55° C., and more preferably 40-50° C. The mass fraction ratio of ammonium sulfate to ammonium (bi)sulfite in at least one stage of fine particle circulating washing liquid may be 1.5-999:1.

When the water content of the flue gas exceeds 15%, the water content may be reduced to 8-18% by blending gas with water vapor volume content ≤5%, and the oxygen content may be controlled to be ≤12%. The gas with water vapor volume content ≤5% may include at least one of air/nitrogen/polluted nitrogen/carbon dioxide gas, preferably air and polluted nitrogen.

When the oxygen content and water content of the flue gas meet the requirements, the flue gas may be, without any treatment, directly sent to the absorption tower for treatment.

Illustrative Embodiments-III

The apparatus may include a gas purification and removal system, an oxidation system and an auxiliary system. The auxiliary system may include an ammonium sulfate post-treatment system, an ammonia supply system and a process water system. The gas purification and removal system may be provided with an absorption tower, which may be controlled by zones and may include a pre-wash zone, an absorption zone and a fine particle control zone, wherein the pre-wash zone, the absorption zone and the fine particle control zone may be each provided with one or more spraying layers, and a device/component that allows only gas to pass through may be provided between the absorption zone and the pre-wash zone.

When the total dust of the purified flue gas is ≤100 mg/Nm³, a device/component that allows only gas to pass through may be provided between the absorption zone and the fine particle control zone, and when the concentration of sulfur dioxide in the flue gas is ≥10,000 mg/Nm³, a device/component that allows only gas to pass through may be provided within the absorption zone.

When the concentration of sulfur dioxide in the flue gas is ≥7,000 mg/Nm³, 2 or more layers of devices/components that allow only gas to pass through may be provided within the fine particle control zone. The fine particle control zone may be provided with one or more layers of demisters, and layers in the pre-wash zone and the absorption zone may be each provided with one or more layers of demisters. Baffle, ridge, filler and screen mesh or a combination thereof is chosen as the forms of demister.

The liquid-gas ratio of each layer in the absorption zone may be a ratio that is not less than 0.4 L/Nm3, and the average spray coverage rate may be a rate that is not less than 200%; the liquid-gas ratio of each layer in the fine particle control zone may be a ratio that is not less than 0.42 L/Nm3, and the average spray coverage rate may be a rate that is not less than 150%. The total area of regions with spray coverage rate of less than 200% in each layer of the absorption zone and the fine particle control zone may be a rate that is not more than 10%, preferably not more than 5%, of the cross-sectional area of the absorption tower.

The oxidation system may be provided in layers or by devices as appropriate for solution composition control, and the fine particle washing circulating liquid and the absorption circulating liquid may be taken out at different positions or from different devices of the oxidation devices of the oxidation system. The oxidation device of the oxidation system may be provided with 1-5 layers of gas-liquid dispersion intensifiers with a liquid level of more than 3.5 m. The solution composition may be controlled through forced oxidation by the oxidation device and/or control of the oxygen content of the tail gas to control natural oxidation and/or control absorption temperature.

The superficial gas flow rate in the absorption tower may be 0.8 m/s-4 m/s, and/or the operating temperature of the pre-wash zone may be 35° C.-80° C.

The $SO_2$ concentration in the original flue gas may be ≤30,000 mg/Nm³.

The purified flue gas $SO_2$ may be ≤400 mg/Nm³, preferably ≤100 mg/Nm³, more preferably ≤35 mg/Nm³, and most preferably ≤10 mg/Nm³.

The total dust (including aerosol) in the purified flue gas may be ≤50 mg/Nm³, preferably ≤20 mg/Nm³, more preferably ≤5 mg/Nm³, and most preferably ≤3 mg/Nm³.

The ammonia escape of the purified flue gas may be ≤8 mg/Nm³, preferably ≤4 mg/Nm³, more preferably ≤2 mg/Nm³, and most preferably ≤1 mg/Nm³.

When the water content of the process gas at the inlet of the absorption tower exceeds 15%, an evaporative crystallization system may be provided. The evaporative crystallization system may include a dual-effect evaporative crystallization process, a single-effect evaporative crystallization process, an MVR evaporative crystallization process, and a dual-effect evaporative crystallization process with a steam jet pump, and the MVR evaporative crystallization process may be preferred.

When the evaporative crystallization system is provided, the apparatus may include a steam condensate treatment device, which may include a membrane separation device and a deaerator. When the membrane separation device is used, the clear liquid outlet of the steam condensate treatment device may be connected to the process water pipe network, and the concentrated liquid outlet may be connected to the absorption tower.

The apparatus may be provided with a circulating water system, the steam condensate of the evaporative crystallization system may be connected to a water supplementing pipe network of the circulating water system, and the circulating water blowdown may be connected to the absorption tower.

When the water content of the flue gas may be 13-18%, an air distribution or condensation system may be used. The oxygen content in the process gas after air distribution may be ≤12%, preferably ≤10%, and more preferably 3-9%.

When the water content of the flue gas exceeds 18%, an air distribution and a condensation device may be used. The oxygen content in the process gas after air distribution may be ≤12%, preferably ≤10%, and more preferably ≤8%.

The air distribution device may include a blower and an air distribution pipe network; the pre-wash zone heat exchange device and/or the absorption zone heat exchange device may include a tubular heat exchanger, an evaporative cooler, an air cooler and a plate heat exchanger; the plate heat exchanger may be preferred in areas where circulating water/primary water may be abundant, and air cooling may be preferred in areas where the average temperature in summer may be ≤30° C.

An illustrative process flow for the apparatus and methods may include:

The process gas may be obtained by treating the flue gas. The process gas may enter from the pre-wash zone, may be cooled and washed by the circulating washing liquid in the pre-wash zone, and the circulating washing liquid may be concentrated simultaneously; the flue gas may then pass respectively through the absorption zone, where it may be washed and desulfurized by the absorption circulating liquid, and the fine particle control zone, where the fine particles may be removed by the fine particle circulating washing liquid, and then may be discharged;

The circulating washing liquid in the pre-wash zone may be mainly supplemented by the fine particle circulating washing liquid, the fine particle circulating washing liquid and/or the process water may be used for washing the scalings on the tower wall and the like, and the absorption circulating liquid may be supplemented by the circulating washing liquid and/or the process water in the fine particle control zone.

The absorption circulating liquid may be oxidized in the oxidation system, and solutions of different compositions may be extracted at different positions or from different devices of the oxidation devices of the oxidation system for circulation respectively.

The process water may be preferably supplemented from the fine particle control zone and/or the fine particle washing circulating tank, or may be supplemented by means of wash water.

The actual production may be affected by various factors, and the composition of the solution will fluctuate. The absorption circulating liquid containing ammonium sulfite may be used for removing sulfur dioxide in flue gas to control aerosol production during absorption in ammonia-based desulfurization.

Illustrative means include staged solution composition control and reaction condition control, wherein the absorption temperature and the oxygen content of the process gas may be controlled to realize high-efficiency desulfurization and dust removal, and while carrying out the high-efficiency desulfurization, ammonia escape and aerosol production during absorption may be controlled. The effective desulfurization material may be ammonium sulfite, the absorption circulating liquid may be a weakly acidic mixed solution of ammonium sulfate-ammonium (bi)sulfite, and the fine particle washing circulating liquid may be a more acidic mixed solution of ammonium sulfate-ammonium (bi)sulfite with a lower concentration, and the coordinated control of absorption, oxidation and concentration may be realized.

An absorption circulating liquid containing ammonium sulfite may be used for removing sulfur dioxide in the flue gas. After absorbing $SO_2$, the absorption circulating liquid may be converted to ammonium sulfite by adding ammonia, and then the ammonia-based desulfurization may be carried out.

The oxygen content of the process gas may be controlled by adjusting the air distribution volume, and the water content of the process gas and absorption temperature may be controlled by air distribution or air distribution and cooling, wherein the cooling method may include air cooling, water cooling and ice machine cooling, the cooling device may include a tubular heat exchanger, an evaporative cooler, an air cooler and a plate heat exchanger, and the plate heat exchanger may be preferred in areas where circulating water/primary water may be abundant.

When a low discharge index may be required, the investment and operation costs may be reduced by reducing the number of stages of absorption cycle and fine particle washing cycle and/or the number of spraying layers and/or circulation volume, and/or increasing the ammonium sulfite content and pH value of the absorption liquid.

The discharge may be ensured to comply with standards or meet the production requirements of subsequent processes by increasing the number of stages of absorption cycle and fine particle washing cycle and/or the number of spraying layers and/or circulation volume, and/or accurately controlling the ammonium sulfite content and pH value of the absorption liquid.

When it may be necessary to control chloride, fluoride and other harmful ions in the circulating solution, part of the fine particle circulating washing liquid may be directly made into ammonium sulfate. The treatment device may include an integrated dryer, see the inventors' authorized patent CN201710336561.2 entitled "Method and apparatus for balancing Cl— and F— contents in circulating liquid of ammonia-based desulfurization," which is hereby incorporated by reference herein in its entirety, for its specific structure, parameters and connection relationship. The chloride ion contents in various circulating solutions may be controlled below 50,000 mg/L, preferably 10,000-31,000 mg/L, and the fluoride ion concentrations may be controlled below 20,000 mg/L, preferably 300-3,000 mg/L.

Illustrative Embodiments-IV

1. An improved method for controlling aerosol production during absorption in ammonia-based desulfurization, characterized in that: the absorption reaction temperature is controlled at 30-60° C., the oxygen content of the process gas is controlled to be ≤12%, and an absorption circulating liquid containing ammonium sulfite is used for removing sulfur dioxide in flue gas, so as to control aerosol production during absorption in the ammonia-based desulfurization.

2. The method according to embodiment 1, characterized in that high-efficiency desulfurization and dust removal are realized by staged solution composition control and reaction condition control, and while carrying out the high-efficiency desulfurization and dust removal, ammonia escape and aerosol production are controlled.

3. The method according to embodiment 1, characterized in that the absorption reaction temperature is 35-56° C., preferably 40-55° C., and most preferably 45-53° C.

4. The method according to embodiment 1, characterized in that the oxygen content of the process gas is ≤10%, preferably 3-9%.

5. The method according to embodiment 1, characterized in that the water content of the process gas is ≤25%, preferably ≤18%, and more preferably 4-15%.

6. The method according to embodiment 2, characterized in that the staged solution composition control comprises concentration gradient control of ammonium sulfite, ammonium bisulfite, ammonium sulfate or a combination thereof; the process gas after preliminary cooling and purification contacts sequentially with an absorption circulating liquid and a fine particle washing circulating liquid to realize the coordinated control of absorption, oxidation and concentration; the absorption circulating liquid is provided with one or more stages as required, wherein at least one stage contains ammonium sulfite and ammonium sulfate, and the fine particle washing circulating liquid is provided with one or more stages as required, wherein at least one stage contains ammonium sulfite and ammonium sulfate.

7. The method according to embodiment 6, characterized in that the pH value of the fine particle washing circulating liquid is lower than that of the absorption circulating liquid, and the ammonium sulfite content is less than that of the absorption circulating liquid.

8. The method according to embodiment 6, characterized in that when multi-stage absorption circulating liquid is chosen, the composition of at least one stage comprises 0.15-4.95% ammonium sulfite and 5-38% ammonium sulfate, and the pH value is 4.5-6.5, the ammonium sulfite content of the upper absorption circulating liquid is lower than that of the lower absorption circulating liquid, and/or the pH value of the upper absorption circulating liquid is lower than that of the lower absorption circulating liquid.

9. The method according to embodiment 6, characterized in that the absorption circulating fluid has 1-2 stages, preferably one stage.

10. The method according to embodiment 6, wherein the composition of at least one stage of the fine particle washing circulating liquid comprises 0.003-1% ammonium sulfite and 0.3-38% ammonium sulfate, and the pH value is 1-6.

11. The method according to embodiment 10, wherein the fine particle washing circulating liquid preferably has 2 stages, and at least one stage contains ammonium sulfate with high concentration, wherein ammonium sulfite is 0.01-1%, and ammonium sulfate is 5-38%.

12. The method according to embodiment 6, characterized in that when the water content of the flue gas exceeds 15%, the water content is reduced to 8-13% by blending gas with water vapor volume content ≤5%, and the oxygen content is controlled to be ≤12%; the gas with water vapor volume content ≤5% includes at least one of air/nitrogen/polluted nitrogen/carbon dioxide gas.

13. An apparatus for controlling aerosol production in ammonia-based desulfurization to implement the method according to any one of embodiments 1-12, characterized by comprising a gas purification and removal system, an oxidation system, and an auxiliary system.

14. The apparatus according to embodiment 13, characterized in that the auxiliary system comprises an ammonium sulfate post-treatment system, an ammonia supply system and a process water system.

15. The apparatus according to embodiment 13, characterized in that the absorption tower of the gas purification and removal system is controlled by zones and comprises a pre-wash zone, an absorption zone and a fine particle control zone, wherein the pre-wash zone, the absorption zone and the fine particle control zone are each provided with one or more spraying layer, and a device/component that allows only gas to pass through is provided between the absorption zone and the pre-wash zone.

16. The apparatus according to embodiment 15, characterized in that a device/component that allows only gas to pass through is provided between the absorption zone and the fine particle control zone as required.

17. The apparatus according to embodiment 15, characterized in that a device/component that allows only gas to pass through is provided within the absorption zone as required.

18. The apparatus according to embodiment 15, characterized in that a device/component that allows only gas to pass through is provided within the fine particle control zone as required.

19. The apparatus according to embodiment 15, characterized in that the fine particle control zone is provided with one or more layers of demisters, and layers in the pre-wash zone and the absorption zone are each provided with one or more layers of demisters as required; baffle, ridge, filler and screen mesh or a combination thereof are chosen as the forms of the demister.

20. The apparatus according to embodiment 15, characterized in that the liquid-gas ratio of each layer in the absorption zone is not less than 0.4 L/Nm3, and the average spray coverage rate is not less than 200%; the liquid-gas ratio of each layer in the fine particle control zone is not less than 0.42 L/Nm3, and the average spray coverage rate is not less than 150%.

21. The apparatus according to embodiment 20, characterized in that the total area of regions with spray coverage rate of less than 200% in each layer of the absorption zone and the fine particle control zone is not more than 10%, preferably not more than 5%, of the cross-sectional area of the absorption tower.

22. The apparatus according to embodiment 13, characterized in that the oxidation system is provided in layers or by devices according to the requirements of solution composition control, and the fine particle washing circulating liquid and the absorption circulating liquid are taken out at different positions or from different devices of the oxidation devices of the oxidation system.

23. The apparatus according to embodiment 15, characterized in that: the superficial gas flow rate of the absorption tower is 0.8 m/s-4 m/s.

24. The apparatus according to embodiment 24, characterized in that the $SO_2$ concentration in the original flue gas is ≤30,000 mg/Nm³.

25. The apparatus according to embodiment 15, characterized in that the purified flue gas $SO_2$ is ≤400 mg/Nm³, preferably ≤100 mg/Nm³, more preferably ≤35 mg/Nm³, and most preferably ≤10 mg/Nm³.

26. The apparatus according to embodiment 15, characterized in that the total dust (including aerosol) in the purified flue gas is ≤50 mg/Nm³, preferably ≤20 mg/Nm³, more preferably ≤5 mg/Nm³, and most preferably ≤3 mg/Nm³.

27. The apparatus according to embodiment 15, characterized in that the ammonia escape of the purified flue gas is ≤8 mg/Nm³, preferably ≤4 mg/Nm³, more preferably ≤2 mg/Nm³, and most preferably ≤1 mg/Nm³.

28. The apparatus according to embodiment 15, characterized in that when the water content of the process gas at the inlet of the absorption tower exceeds 15%, an evaporative crystallization system and/or a pre-wash zone heat exchange device and/or an absorption zone heat exchange device is provided.

29. The apparatus according to embodiment 28, characterized in that a dual-effect evaporative crystallization process, a single-effect evaporative crystallization process, an MVR evaporative crystallization process, and a dual-effect evaporative crystallization process with a steam jet pump are chosen for the evaporative crystallization system, and the MVR evaporative crystallization process is preferred.

30. The apparatus according to embodiment 29, further comprising a steam condensate treatment device, which comprises a membrane separation device and a deaerator, wherein the clear liquid outlet of the steam condensate concentration device is connected to the process water pipe network, and the concentrated liquid outlet is connected to the absorption tower.

31. The apparatus according to embodiment 29, further comprising a circulating water system, wherein the steam condensate is connected to a water supplementing pipe network of the circulating water device, and the circulating water blowdown is connected to the absorption tower.

32. The apparatus according to embodiment 15, characterized in that when the water content in the original flue gas exceeds 15%, an air distribution device or a condensation device is provided, and the oxygen content in the process gas after air distribution is ≤12%, preferably ≤10%, and more preferably 3-9%.

33. The apparatus according to embodiment 15, characterized in that when the water content in the original flue gas exceeds 18%, an air distribution device and/or a pre-wash zone heat exchange device and/or an absorption zone heat exchange device is provided, and the oxygen content in the process gas after air distribution is ≤12%, preferably ≤10%, and more preferably ≤3-9%.

34. The apparatus according to embodiment 33, characterized in that the pre-wash zone heat exchange device and/or the absorption zone heat exchange device includes a tubular heat exchanger, an evaporative cooler, an air cooler and a plate heat exchanger; the plate heat exchanger is preferred in areas where circulating water/primary water is abundant, and air cooler is preferred in areas where the average temperature in summer is ≤30° C.

Illustrative Embodiments-V

In an illustrative method for controlling aerosol production during absorption in ammonia-based desulfurization as shown in FIG. 1, an absorption circulating liquid containing ammonium sulfite may be used for removing sulfur dioxide in flue gas, so as to control aerosol production during absorption in ammonia-based desulfurization.

High-efficiency desulfurization and dust removal may be realized by staged solution composition control and reaction condition control, and while carrying out the high-efficiency desulfurization, ammonia escape and aerosol production may be controlled.

The staged solution composition control may include concentration gradient control of ammonium sulfite, ammonium bisulfate, ammonium sulfate or a combination thereof.

The temperature of absorption reaction may be 40-55° C., and may be 47-51° C.

The oxygen content of process gas 9 may be ≤12%, and may be 3-8.5%.

The process gas 9 after preliminary cooling and purification contacts sequentially with an absorption circulating liquid 7 and a fine particle washing circulating liquid 15 to realize the coordinated control of absorption, oxidation and concentration. The absorption circulating liquid 7 may be provided with 2 stages, both containing ammonium sulfite and ammonium sulfate, and the fine particle washing circulating liquid 15 may be provided with 3 stages as appropriate, wherein 2 stages contain ammonium sulfite and ammonium sulfate, and 1 stage may be process water. The pH value of the fine particle washing circulating liquid 15 may be lower than the pH value of the absorption circulating liquid 7, and the ammonium sulfite content may be less than that of the absorption circulating liquid 7.

The 1st stage and 2nd stage absorption circulating liquids 7 both may contain 0.3-3% ammonium sulfite and 12-23% ammonium sulfate, the pH values of the 1st stage and 2nd stage absorption circulating liquids may be 5.5-6.3 and 5-5.9, respectively, and the ammonium sulfite content of the upper absorption circulating liquid 7 may be lower than that of the lower absorption circulating liquid 7. The mass fraction ratio of ammonium sulfate to ammonium (bi)sulfite in the 1st stage absorption circulating liquid 7 may be 9-99:1.

The 1st stage fine particle washing circulating liquid 15 may include 0.02-0.05% ammonium (bi)sulfite and 15-25% ammonium sulfate, and the pH value may be 4-4.3. The 2nd stage fine particle washing circulating liquid 15 may include 0.004-0.01% ammonium (bi)sulfite and 0.5-3.3% ammonium sulfate, and the pH value may be 3.6-3.9.

The washing temperature of the fine particles may be 38-49.5° C., and the mass fraction ratio of ammonium sulfate to ammonium (bi)sulfite in the 1st stage fine particle circulating washing liquid 15 may be 99-199:1.

The water content of the flue gas may be 10-13%. The water content may be reduced to 8-11% by blending air, and the oxygen content may be controlled to be 6-9%.

The apparatus may include a gas purification and removal system, an oxidation system and an auxiliary system. The auxiliary system may include an ammonium sulfate post-treatment system 24, an ammonia supply system and a process water system. The gas purification and removal system may be provided with an absorption tower 1, which may be controlled by zones and may include a pre-wash zone 4, an absorption zone 5 and a fine particle control zone 6, wherein the pre-wash zone 4, the absorption zone 5, and the fine particle control zone 6 may be respectively provided with 1, 3 and 3 spraying layers, and a device/component 17 that allows only gas to pass through may be provided between the absorption zone 5 and the pre-wash zone 4.

A device/component 18 that allows only gas to pass through may be provided between the absorption zone 5 and the fine particle control zone 6.

A stage of device/component 18 that allows only gas to pass through may be provided within the fine particle control zone 6. The fine particle control zone 6 may be provided with 5 layers of demisters, 2 of which may be in the lower part and 3 may be in the upper part, the pre-wash zone 4 and the absorption zone 5 may be without demisters, and a combination of baffle and ridge may be chosen as the demister.

The liquid-gas ratio of each layer in the absorption zone 5 may be 1.6 L/Nm3, and the average spray coverage rate may be a rate that is not less than 300%; the liquid-gas ratios in the fine particle control zone 6 may be 1.6/2.2/0.2 L/Nm3 respectively, and the average spray coverage rates of the lower 2 layers may be a rate that is not less than 300%. The total area of regions with spray coverage rate of less than 200% in the 1-2 layers of the absorption zone 5 and the fine particle control zone 6 accounts for 2-5% of the cross-sectional area of the absorption tower.

The oxidation system may be provided in layers according to the requirements of solution composition control, and the fine particle washing circulating liquid 15 and the absorption circulating liquid 7 may be taken out of the oxidation device 2 of the oxidation system at different positions. The oxidation device 2 of the oxidation system may be provided with 2 layers of gas-liquid dispersion intensifiers 19 with a liquid level of 8-9.5 m. The solution composition may be controlled by forced oxidation by the oxidation device 2 and/or control of the oxygen content of the process gas to control natural oxidation and/or control absorption temperature.

The superficial gas flow rate in the absorption tower 1 may be 2.68-2.75 m/s, and the operating temperature of the pre-wash zone may be 49° C.-54° C.

When the water content of the inlet process gas exceeds 15%, an evaporative crystallization system 25 may be provided. The evaporative crystallization system may include a dual-effect evaporative crystallization process, a single-effect evaporative crystallization process, an MVR evaporative crystallization process, and a dual-effect evaporative crystallization process with a steam jet pump, and the MVR evaporative crystallization process may be preferred.

When an evaporative crystallization system 25 is provided, the apparatus may include a steam condensate treatment device 27, wherein the steam condensate treatment device 27 may include a membrane separation device and a deaerator; when the membrane separation device may be used, the clear liquid outlet of the steam condensate treatment device 27 may be connected to the process water pipe network, and the concentrated liquid outlet may be connected to the fine particle control zone 6 of the absorption tower 1.

The apparatus may be provided with a circulating water system 28 as appropriate. The steam condensate 26 of the evaporative crystallization system 25 may also be connected to the water supplementing pipe network of the circulating water system 28, and the circulating water blowdown may be connected to the absorption tower 1.

The air distribution device may include a process blower 31 and an air distribution pipe network, and the absorption zone heat exchange device 30 may include a plate heat exchanger.

An illustrative process flow of the apparatus and methods may include:

The flue gas and the process air may be mixed, the resultant process gas 9 may enter from the pre-wash zone 4 of the absorption tower 1, may be cooled and washed by the pre-wash circulating liquid 20 in the pre-wash zone 4, and the pre-wash circulating liquid 20 may be concentrated simultaneously; the process gas may then pass respectively through the absorption zone 5, where it may be washed and desulfurized by the absorption circulating liquid 7, and the fine particle control zone 6, where the fine particles may be removed by the fine particle circulating washing liquid 15, and may be then discharged.

The pre-wash circulating liquid 20 in the pre-wash zone 4 may be supplemented by the fine particle circulating washing liquid 15, the fine particle circulating washing liquid 15 and/or the process water may be used for washing off scalings from the tower wall and the like, and the absorption circulating liquid 7 may be supplemented by the circulating washing liquid 15 in the fine particle control zone and/or the process water 23.

The process water 23 may be preferably supplemented from the fine particle control zone 6 and/or the fine particle washing circulating tank 3, or may be supplemented by means of wash water.

The superficial gas flow rate in the absorption tower 1 may be 2.75 m/s, and the operating temperature of the pre-wash zone 4 may be 51-55° C.

The flow of the original flue gas may be 606,000 Nm$^3$/h, the SO$_2$ concentration may be 4,500 mg/Nm$^3$, the total dust concentration may be 18.5 mg/Nm$^3$, the air distribution volume may be 62,000 Nm$^3$/h, the purified flue gas SO$_2$ may be 29.4 mg/Nm$^3$, the total dust (including aerosol) may be 5.4 mg/Nm$^3$, and the ammonia escaped may be 1.6 mg/Nm$^3$.

The composition of the absorption circulating liquid 7 may be ensured through forced oxidation by the oxidation device 2 and controlling the oxygen content of the process gas and the operating temperature.

The mass fraction ratio of ammonium sulfate to ammonium sulfite in the 2nd-stage absorption circulating liquid 7 may be 24:1.

The mass fraction ratio of ammonium sulfate to ammonium sulfite in the fine particle circulating washing liquid 15 of the lowermost layer may be 125:1.

Figure 2:
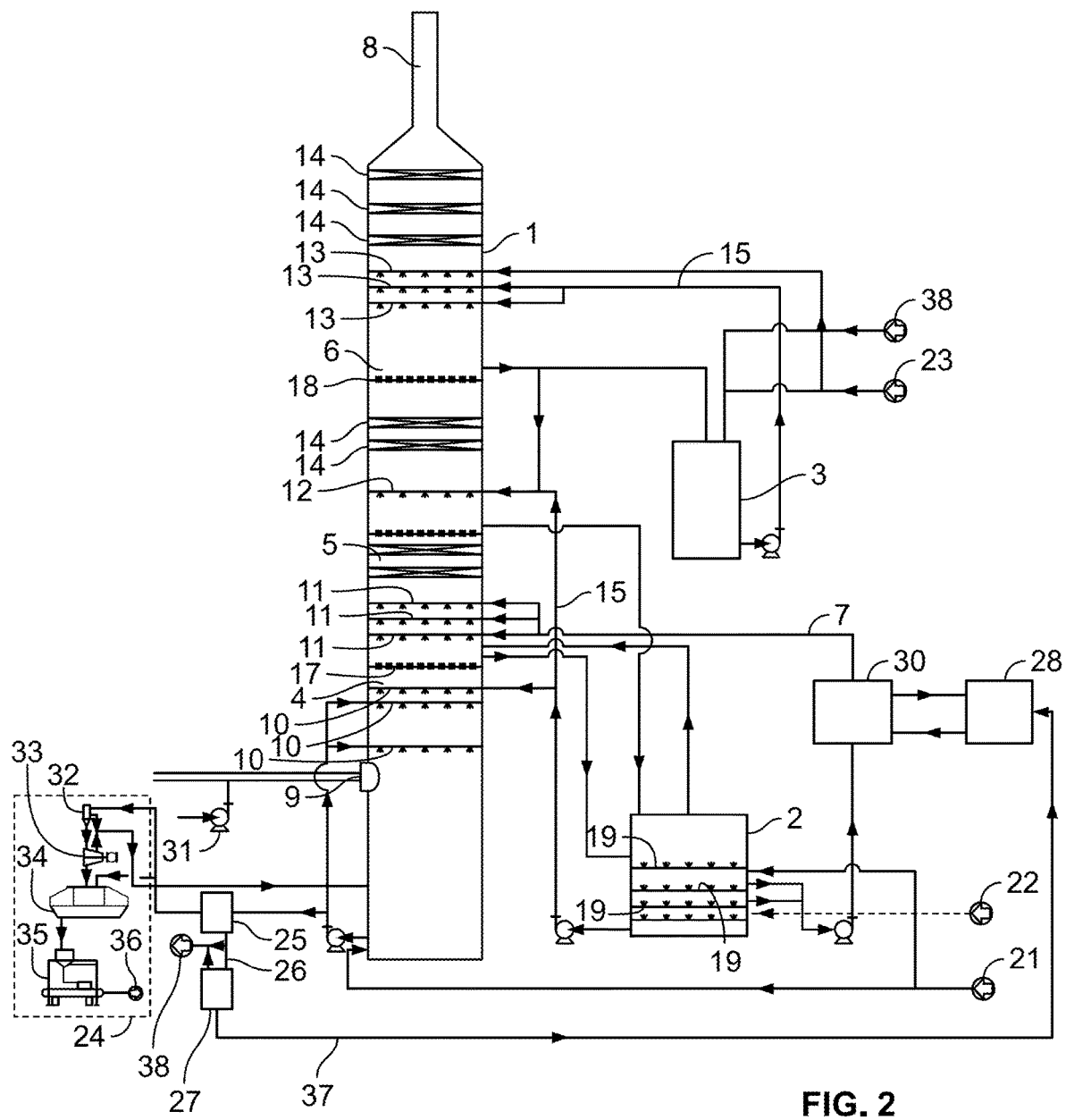
FIG. 2 is a schematic diagram of example 1.

A 0.02-0.05% (mass fraction) fine particle circulating washing liquid 15 may be directly made into ammonium sulfate. The treatment device may include an integrated drying tower 34, see the inventors' authorized patent CN201710336561.2 entitled "Method and apparatus for balancing Cl— and F— contents in circulating liquid of ammonia-based desulfurization," which is hereby incorporated by reference herein in its entirety, and FIG. 2 for its specific structure, parameters and connection relationship. The chloride ion content in the pre-wash circulating liquid 20 may be controlled to be 15,000-32,000 mg/L, the chloride ion in the absorption circulating liquid 7 may be controlled to be 5,000-11,000 mg/L, and the fluoride ion concentration in the pre-wash circulating liquid 20 may be controlled to be 1,200-2,200 mg/L.

Apparatus and methods described herein are illustrative. Some embodiments may omit features shown and/or described in connection with the illustrative apparatus. Some embodiments may include features that are neither shown nor described in connection with the illustrative apparatus.

The steps of illustrative methods may be performed in an order other than the order shown and/or described herein. Some embodiments may omit steps shown and/or described in connection with the illustrative methods. Some embodiments may include steps that are neither shown nor described in connection with the illustrative methods.

Features of illustrative apparatus and methods may be combined. For example, an illustrative embodiment may include features shown in connection with another illustrative embodiment. Embodiments may involve some or all of the features of the illustrative apparatus and/or some or all of the steps of the illustrative methods.

Apparatus and methods in accordance with the invention will now be described in connection with the Examples and the FIGS., which form a part hereof. It is to be understood that other embodiments may be utilized and that structural, functional and procedural modifications may be made without departing from the scope and spirit of the present invention.

Example

1. A Method for Controlling Aerosol Production During Absorption in Ammonia-Based Desulfurization.

An absorption circulating liquid containing ammonium sulfite was used for removing sulfur dioxide in flue gas, so as to control aerosol production during absorption in the ammonia-based desulfurization.

High-efficiency desulfurization and dust removal were realized by staged solution composition control and reaction condition control, and while carrying out the high-efficiency desulfurization, ammonia escape and aerosol production were controlled.

The staged solution composition control comprised concentration gradient control of ammonium sulfite, ammonium bisulfite, ammonium sulfate or a combination thereof.

The absorption reaction temperature was controlled at 48-52° C., and normally 49.8-50.4° C.

Through air distributing by a process blower 31, the oxygen content of the process gas was adjusted to be ≤11%, normally 7-9%, and the air distribution volume was 23,000-30,000 Nm$^3$/h.

After the sulfur recovery tail gas and the air fed by the process blower 31 were fully mixed, the resultant process gas 9 entered from the pre-wash zone of the absorption tower; after preliminary cooling and purification by the pre-wash circulating liquid 20 in the pre-wash zone, the process gas contacted sequentially with the absorption circulating liquid 7 and the fine particle washing circulating liquid 15 to realize the coordinated control of absorption, oxidation and concentration; the absorption circulating liquid was provided with 2 stages, taken out at different positions of the oxidation device, and delivered by using a separate pump. The first-stage absorption circulating liquid was 1-1.5% ammonium sulfite and 18-22% ammonium sulfate, the pH value was 6-6.3, and the absorption temperature was 50.1-50.4° C.; the 2nd-stage absorption circulating liquid was 0.7-1.1% ammonium sulfite and 19-23% ammonium sulfate, the pH value was 5.2-5.5, and the absorption temperature was 49.8-50.1° C.; the fine particle circulating washing liquid was provided with 4 stages, of which the first stage was a mixed solution of ammonium sulfate-ammonium sulfite with high concentration, wherein ammonium sulfite was 0.15-0.25%, ammonium sulfate was 20-24%, the pH value was 4.2-4.5, and the washing temperature was 49.7-50° C.; the second stage and the third stage were dilute mixed solution of ammonium sulfate-ammonium sulfite, wherein ammonium sulfite was 0.004-0.01%, ammonium sulfate was 1.5-3%, the pH value was 3.9-4.2, and the washing temperature was 49.5-49.8° C.; and the fourth stage was process water.

Heat was removed from the absorption circulating liquid 7 and the pre-wash circulating liquid 20 through circulating water cooling. Part of the pre-wash circulating liquid 20 after evaporative crystallization was sent to the ammonium sulfate post-treatment system 24, and the ammonium sulfate product 36 was obtained through solid-liquid separation, centrifugation, drying and packaging.

Part of the steam condensate 26 was treated by the steam condensate treatment device 27 and then recovered as supplementing water for the circulating water system 28.

2. An Apparatus for Controlling Aerosol Production During Absorption in Ammonia-Based Desulfurization The apparatus included a gas purification and removal system, an oxidation system and an auxiliary system. The auxiliary system comprised an ammonium sulfate post-treatment system 24, an ammonia supply system, an evaporative crystallization system 25, a circulating water system 28, a process water system and a steam condensate treatment device 27.

The gas purification and removal system included an absorption tower 1, a process blower 31, a fine particle washing circulating tank 3, a pre-wash circulating pump, a pre-wash cooling device 29, an absorption cooling device 30 and a fine particle washing circulating pump, wherein the absorption tower 1 was controlled by zones and was mainly divided into a pre-wash zone 4, an absorption zone 5 and a fine particle control zone 6, wherein the pre-wash zone 4, the absorption zone 5 and the fine particle control zone 6 were each provided with 3/4/4 layers of spraying layers; a gas-liquid separator a 17 allowing only gas to pass through was provided between the absorption zone 5 and the pre-wash zone 4, and a gas-liquid separator a 17 allowing only gas to pass through was also provided between the absorption zone 5 and the fine particle control zone 6; the fine particle control zone 6 was sprayed in four stages, in which a gas-liquid separator b 18 allowing only gas to pass through was provided between the first layer of spraying and the second layer of spraying, and the first layer of spray liquid and the absorption circulating liquid separately entered the oxidation device.

The fine particle control zone was provided with 5 layers of demisters, of which 2 layers were below the gas-liquid separator b, i.e., 1 layer of baffle and 1 layer of ridge, and 3 layers were below the purified flue gas outlet 8, i.e., 2 layers of ridges and 1 layer of screen mesh.

The liquid-gas ratio of each layer in the absorption zone was 1.75 L/Nm3, and the spray coverage rate was 320%; the liquid-gas ratios of each layer in the fine particle control zone from top down were 0.3, 2.2, 2.2 and 1.75 L,Nm$^3$ respectively, and the spray coverage rates were 110, 330, 330 and 330% respectively. The total area of regions with spray coverage rate of less than 200% in the 1-3 layers of the absorption zone and the fine particle control zone accounted for 3-7% of the cross-sectional area of the absorption tower.

The oxidation system included an oxidation device 2, which was provided in layers appropriate for the desired solution composition control. The fine particle washing circulating liquid 15 and the absorption circulating liquid 7 were taken out of the oxidation device 2 at different positions. Two layers of gas-liquid dispersion intensifiers were provided within the oxidation device, and perforated plate aeration heads were chosen for the gas-liquid dispersion intensifier.

The liquid level of the oxidation device was 9 m, and the excess of oxidizing air was 420%.

The diameter of the absorption tower was 4 m, and the superficial gas flow rate was 2.55-2.75 m/s;

The evaporative crystallization system adopted an MVR evaporative crystallization process, including a steam compressor, an evaporation separation chamber, an evaporation circulating pump, etc. Part of the steam condensate in the evaporation separation chamber was returned to the absorption tower 1 for recycling, and part of it was sent to the steam condensate treatment device 27 for processing.

A process blower 31 and an air distribution pipe network were provided.

The pre-wash zone heat exchange device 29 and the absorption zone heat exchange device 30 adopted an integrated plate heat exchanger.

The ammonium sulfate post-treatment system included a solid-liquid separation device 32, a centrifuge 33, an integrated dryer 34 and a packaging machine 35 connected in sequence. Part of the pre-wash circulating liquid after evaporative crystallization entered the solid-liquid separation device 32, and part of it entered the integrated dryer 34, and the ammonium sulfate product 36 was obtained through solid-liquid separation, centrifugation, drying and packaging.

The pre-wash cooling device 29 and the absorption cooling device 30 were used for cooling the pre-wash circulating liquid and the absorption circulating liquid respectively, and the cooling medium was the circulating water of the circulating water system.

After part of the steam condensate 26 was treated by the steam condensate treatment device 27, the clear liquid 37 was used as the supplementing water for the circulating water system, and the concentrated liquid 38 was used as the supplementing water for the fine particle washing circulating liquid 15. The concentrated liquid 38 may have a concentration that is 10-200 times the concentration of the clear liquid 37.

In general, the quality of the clear liquid is 3 to 10 times that of the concentrate. For example, if the concentration of untreated (before entering steam condensate treatment system 27) steam condensate 26 is 0.5 g ammonium sulfate/L, 10 parts of untreated steam condensate 26 result, after treatment by steam condensate treatment system 27, in 8 parts of clear liquid 37 (0.05 g ammonium sulfate/L) and 2 parts of concentrated liquid 38 (2.3 g ammonium sulfate/L). The concentration of the concentrated liquid 38 is thus calculated to be 46 times that of clear liquid 37.

All the steam condensate 26 could also be directly used as the supplementing water for the circulating water system.

After evaporative crystallization, 90-90% of the concentrated circulating liquid entered the solid-liquid separation device 32, and 10-20% entered the integrated drying tower 34, see the inventors' authorized patent CN201710336561.2 entitled "Method and apparatus for balancing Cl— and F— contents in circulating liquid of ammonia-based desulfurization," which is hereby incorporated by reference herein in its entirety, for the specific structure, parameters and connection relationship of the integrated drying tower 34. The chloride ion content in the pre-wash circulating liquid was controlled to be 2,000-3,200 mg/L, the chloride ion in the absorption circulating liquid was controlled to be 500-980 mg/L, and the fluoride ion concentration in the pre-wash circulating liquid was controlled to be 100-240 mg/L.

3. Process Flow and Parameters of a Method for Controlling Aerosol Production During Absorption in Ammonia-Based Desulfurization The specific process flow of the above method or apparatus was as follows:

After the sulfur recovery tail gas and the process air were mixed, the resultant process gas 9 entered from the pre-wash zone 4, was cooled and washed by the circulating washing liquid in the pre-wash zone 4, and the circulating washing liquid was concentrated simultaneously; the flue gas then passed respectively through the absorption zone 5 where it was washed and desulfurized by the absorption circulating liquid 7 and the fine particle control zone 6 where the fine particles were removed by the fine particle circulating washing liquid 15, and was then discharged;

The circulating washing liquid in the pre-wash zone 4 was mainly supplemented by the fine particle circulating washing liquid 15, the fine particle circulating washing liquid 15 and/or the process water 23 was used for washing the scalings off the tower wall and the like, and the absorption circulating liquid was supplemented by the fine particle circulating washing liquid 15 and/or the process water 23.

The absorption circulating liquid 7 was oxidized in the oxidation device 2, and solutions of different compositions were extracted at different positions of the oxidation device 2 for circulating in the absorption zone 5 and the fine particle control zone 6.

The process water 23 was supplemented from the fine particle control zone 6 and the fine particle washing circulating tank 3.

The second-stage fine particle washing circulating liquid 15 (a dilute mixed solution of ammonium sulfate-ammonium sulfite) was mixed through a pipeline with the first-stage fine particle washing circulating liquid 15 (a mixed solution of ammonium sulfate-ammonium sulfite with high concentration), and then entered the spraying layers of the fine particle control zone 6 in the absorption tower 1.

The absorbent was 20% ammonia liquor which was supplemented into the pre-wash zone 4 and the oxidation device 2. An absorption circulating liquid containing ammonium sulfite was used for removing sulfur dioxide in the flue gas. Ammonia was added to the oxidation device to be converted into ammonium sulfite, and then the ammonia-based desulfurization was carried out. At the same time, ammonia was added to the pre-wash zone and the evaporative crystallization system to ensure that the free acid index in the ammonium sulfate product is no more than a standard. The standard may be 0.2%, w/w, of the product. The standard may be 0.3%, w/w, of the product. The standard may be set forth in GB535-95, which is hereby incorporated by reference herein in its entirety. The standard may be set forth in T/CPCIF006-2017, which is hereby incorporated by reference herein in its entirety.

The oxidizing air was added to the oxidation device 2, and the outlet gas of the oxidation device 2 was introduced into the absorption zone 5 and the pre-wash zone 4 in the absorption tower 1 to naturally oxidize the absorption liquid.

The superficial gas flow rate in the absorption tower 1 was 2.54 m/s;

The designed flow of the sulfur recovery tail gas was 75,000 $Nm^3/h$, the designed $SO_2$ concentration was 18,000 $mg/Nm^3$, and the total dust concentration was $\leq 10$ $mg/Nm^3$.

During the test, the purified flue gas $SO_2$ was 42 $mg/Nm^3$, the total dust (including aerosol) was 6.9 $mg/Nm^3$, and the ammonia escaped was 2.8 $mg/Nm^3$.

The absorption temperature was controlled at 48-52° C. through air distribution and cooling by the pre-wash circulating liquid 20, and cooling by the absorption circulating liquid 7.

The composition of the zonal solution was mainly controlled through forced oxidation by the oxidation device 2, natural oxidation in the absorption zone 4, and controlling the oxygen content of the process gas, the pre-wash temperature, the absorption temperature and other means.

TABLE 1

| No. | Process index | Unit | Value |
|---|---|---|---|
| 1 | Flue gas flow | $Nm^3/h$ | 75,000 |
| 2 | Flue gas inlet temperature | ° C. | 240-260 |
| 3 | $SO_2$ concentration in flue gas | $mg/Nm^3$ | 18,000 |
| 4 | Process air volume used | $Nm^3/h$ | 28,000 |
| 5 | Dust concentration at flue gas inlet | $mg/Nm^3$ | $\leq 10$ |
| 6 | $SO_2$ concentration in outlet flue gas | $mg/Nm^3$ | $\leq 50$ |
| 7 | Dust concentration in outlet flue gas | $mg/Nm^3$ | $\leq 10$ |
| 8 | Ammonia escape concentration in outlet flue gas | $mg/Nm^3$ | $\leq 5$ |
| 9 | Ammonia recovery rate | % | $\geq 99$ |

4. Implementation Effects

The apparatus and method of the Example were used for carrying out ammonia-based desulfurization and dust removal for flue gas under different working conditions. Table 2 shows the test methods and instruments, and Table 3 shows the operating parameters and test results.

TABLE 2

List of test methods for various indexes and major instruments.

| No. | Item monitored | Standard name and number of analytical method | Name and model of instrument | Instrument number |
|---|---|---|---|---|
| 1 | Smoke dust | The determination of particulates and sampling methods of gaseous pollutants emitted from exhaust gas of stationary source GB/T16157-1996, which is hereby incorporated by reference herein in its entirety. | Laoying 3012H Type smoke dust sampler Electronic balances BS2245, AB204-S | 8042448, 08244496 18360886, 1119051201 |
| 2 | $SO_2$ | Determination of sulfur dioxide from exhausted gas of stationary source Fixed-potential electrolysis method HJ/T 57-2000 | Testo 350 flue gas analyzer | 10[#], 1[#] |
| 3 | NOx | Determination of nitrogen oxides from exhausted gas of stationary source Fixed-potential electrolysis method HJ/T 693-2014 | Testo 350 flue gas analyzer | 10[#], 1[#] |
| 4 | Ammonia | Ambient air and exhausted gas-Determination of ammonia Nessler's reagent spectrophotometry HJ 533-2009 | Laoying 3072H type 722 spectrophotometer | 02085809, 2c5BP363 |

TABLE 2-continued

List of test methods for various indexes and major instruments.

| No. | Item monitored | Standard name and number of analytical method | Name and model of instrument | Instrument number |
|---|---|---|---|---|
| 5 | Oxygen content in flue gas | Electrochemical method-Specifications and test procedures for continuous emission monitoring systems of flus gas emitted from stationary sources (Appendix B) (HJ/T 76-2007, which is hereby incorporated by reference herein in its entirety) | Testo 350 flue gas analyzer | 10#, 1# |
| 6 | Flue gas temperature | Platinum resistance method-Determination of particulates and sampling methods of gaseous pollutants from exhausted gas of stationary source (GB/T 16157-1996, which is hereby incorporated by reference herein in its entirety.) | TES-1310 | / |
| 7 | Flue gas humidity | Specifications and test procedures for continuous emission monitoring systems of flue gas emitted from stationary sources (Appendix B) (HJ/T 76-2007, which is hereby incorporated by reference herein in its entirety) | Laoying 3012H type smoke dust sampler | 8042448, 08244496 |
| 8 | Ammonium sulfate | Ammonium sulfate (GB 535-1995, which is hereby incorporated by reference herein in its entirety.) | Analytical balance, pH meter and other conventional laboratory instruments | |

TABLE 3

Apparatus operating parameters and test results

| No. | Item | | Unit | Test result | Remarks |
|---|---|---|---|---|---|
| 1 | Flue gas volume in absorption tower | Standard state, wet basis, and actual $O_2$ | $\times 10^4$ m$^3$/h | 9.69 | — |
| | | Standard state, dry basis, and 6% $O_2$ | $\times 10^4$ m$^3$/h | 8.42 | — |
| 2 | System resistance | | Pa | 1520 | — |
| 3 | Original flue gas parameters | $SO_2$ concentration (standard state, dry basis, and 6% $O_2$) | mg/Nm$^3$ | 17,400 | Average value during test |
| | | $O_2$(V/V) | % | 3 | — |
| | | Temperature | ° C. | 252 | Average value during test |
| | | Moisture content(V/V) | % | 27.8 | — |
| | | Smoke dust concentration (standard state, dry basis, and 6% $O_2$) | mg/Nm$^3$ | 8.6 | — |
| 4 | Purified flue gas parameters | $SO_2$ concentration (standard state, dry basis, and 6% $O_2$) | mg/Nm$^3$ | 42 | Average value during test |
| | | $O_2$(V/V) | % | 9.7 | — |
| | | Temperature | ° C. | 49.6 | Average value during test |
| | | Moisture content(V/V) | % | 13.2 | — |
| | | Smoke dust concentration (standard state, dry basis, and 6% $O_2$) | mg/Nm$^3$ | 6.9 | Including solid particles and soluble solid particles |
| | | Free ammonia escaped (standard state, dry basis, and 6% $O_2$) | mg/Nm$^3$ | 2.8 | — |
| 5 | Desulfurization efficiency of absorption tower | | % | 99.8 | |
| 6 | Dust removal efficiency of absorption tower | | % | 19.8 | — |

TABLE 3-continued

Apparatus operating parameters and test results

| No. | Item | | Unit | Test result | Remarks |
|---|---|---|---|---|---|
| 7 | Ammonia consumption (on the basis of 20% ammonia liquor) | | t/h | 3.6 | |
| 8 | Ammonia utilization | | % | 99.4 | — |
| 9 | Ammonium sulfate by-product | Nitrogen content | % | 21.3 | |
| | | Moisture | % | 0.45 | — |
| | | Free acid content | % | 0.23 | — |

Thus, apparatus and methods for controlling, at the source, ammonia escape and aerosol production, have been provided. Persons skilled in the art will appreciate that the present invention can be practiced by other than the described examples, which are presented for purposes of illustration rather than of limitation. The present invention is limited only by the claims that follow.

What is claimed is:

1. Apparatus for absorption of sulfur dioxide from a flue gas, the apparatus comprising:
    a reactor configured to receive the flue gas;
    a spraying layer that is disposed in the reactor and is configured to contact the flue gas with an ammonia-bearing liquid that contains ammonium sulfite and absorbs, at a temperature, sulfur from the flue gas;
    a control that is configured to:
        limit oxygen content of material entering the reactor to a content that is no greater than 12% by volume; and
        lower the temperature in response to an excess aerosol content in effluent from the reactor;
    an oxidation system configured to oxidize the liquid; and
    an auxiliary system that is configured to derive ammonium sulfate solid from the liquid.

2. The apparatus of claim 1 wherein the auxiliary system comprises:
    an ammonium sulfate post-treatment system;
    an ammonia supply system; and
    a process water system.

3. The apparatus of claim 1 wherein:
    the reactor includes an absorption tower in which is defined:
        a pre-wash zone;
        an absorption zone; and
        a fine particle control zone;
    wherein:
        each of the zones includes one or more spraying layer;
        a first gas-liquid separator is disposed between the absorption zone and the pre-wash zone; and
        a second gas-liquid separator is disposed between the absorption zone and the fine particle control zone.

4. The apparatus of claim 3 wherein:
    a third gas-liquid separator is disposed within the absorption zone; and
    a fourth gas-liquid separator is disposed within the fine particle zone.

5. The apparatus of claim 3 wherein:
    in the absorption zone, in each layer:
        a liquid-gas ratio is not less than 0.4 L/Nm3; and
        an average spray coverage rate is not less than 200%; and,
    in the fine particle control zone, in each layer:
        a liquid-gas ratio is not less than 0.42 L/Nm3; and
        an average spray coverage rate is not less than 150%.

6. The apparatus of claim 3 wherein the oxidation system includes an oxidation tank configured to:
    receive used absorption liquid;
    flow:
        a first fraction of the used absorption liquid through a first path; and
        a second fraction of the absorption liquid through a second path; and
    provide:
        from the first path, a first output to the fine particle control zone; and,
        from the second path, a second output to the absorption zone;
    wherein the first output is more oxidized than is the second output.

7. The apparatus of claim 6 wherein the oxidation tank includes:
    an array of gas-liquid dispersion intensifiers;
    a first output port that is:
        disposed at a first location along the array; and
        configured to provide the first output;
    a second output port that is:
        disposed at a second location along the array; and
        configured to provide the second output; and
    an ammonia chamber that defines perforations for passage of:
        ammonia from the chamber to the first path; and
        used absorption liquid into the chamber;
    wherein the second location causes less oxidation of the used absorption liquid than does the first location.

8. The apparatus of claim 6 wherein the oxidation tank includes:
    a separator; and,
    in the first path, an oxidized air source;
    wherein the second path passes outside the separator;
    wherein:
        no oxidized air is provided along the second path; and
        the used absorption liquid at the first output is fully oxidized.

9. The apparatus of claim 3 wherein the tower is configured to:
    flow the flue gas at a superficial gas flow rate of 0.8 m/s-4 m/s; and
    receive flue gas having an $SO_2$ concentration of up to 30,000 mg/Nm$^3$.

10. The apparatus of claim 9 wherein the total dust content is not more than 20 mg/Nm$^3$.

11. The apparatus of claim 10 wherein the total dust content is not more than 5 mg/Nm$^3$.

12. The apparatus of claim 3 wherein the effluent has an $SO_2$ content that is not more than 100 mg/Nm3.

13. The apparatus of claim 12 wherein the effluent has an $SO_2$ content that is not more than 35 mg/Nm$^3$.

14. The apparatus of claim 3 wherein the tower is configured to emit effluent having an ammonia escape that is no more than 8 mg/Nm³.

15. The apparatus of claim 14 wherein the tower is configured to emit effluent having an ammonia escape that is no more than 2 mg/Nm³.

16. The apparatus of claim 3 further comprising:
an additive gas source that is configured to flow additive gas into the flue gas before the flue gas enters the tower, a mixture of the additive gas and the flue gas being process gas and having, at an inlet of the tower, a water content that exceeds 15%; and
an evaporative crystallization system configured to crystallize ammonium sulfate from absorbed $SO_2$ after absorption of $SO_2$ in the ammonia-bearing liquid.

17. The apparatus of claim 16 further comprising a steam jet pump that is part of a dual-effect evaporative crystallization process.

18. The apparatus of claim 16 wherein the evaporative crystallization system is configured to perform an MVR evaporative crystallization process.

19. The apparatus of claim 3 further comprising:
an additive gas source that is configured to flow additive gas into the flue gas before the flue gas enters the tower, a mixture of the additive gas and the flue gas being process gas having, at an inlet of the tower, a water content that exceeds 15%;
a heat exchanger configured to exchange heat with the ammonia-bearing liquid before the ammonia-bearing liquid is sprayed in the absorption zone; and
an evaporative crystallization system configured to crystallize ammonium sulfate from absorbed $SO_2$ after absorption of $SO_2$ in the ammonia-bearing liquid.

20. The apparatus of claim 3 further comprising:
an additive gas source that is configured to flow additive gas into the flue gas before the flue gas enters the tower, a mixture of the additive gas and the flue gas being process gas having, at an inlet of the tower, a water content that exceeds 15%;
a heat exchanger configured to exchange heat with the ammonia-bearing liquid before the ammonia-bearing liquid is sprayed in the absorption zone;
a heat exchanger configured to exchange heat with pre-wash fluid before the pre-wash fluid is sprayed in the pre-wash zone; and
an evaporative crystallization system configured to crystallize ammonium sulfate from absorbed $SO_2$ after absorption of $SO_2$ in the ammonia-bearing liquid.

21. The apparatus of claim 3 further comprising an air distribution device configured to:
flow air into the flue gas, to form process gas, before the flue gas enters the tower; and
limit an oxygen content of the process gas, downstream of the air distribution device and upstream of the tower, to no greater than 12% by volume;
wherein the flue gas, prior to mixing with the air, has a water content that exceeds 15% by volume.

22. The apparatus of claim 21 wherein the oxygen content is in the range 3-9%.

23. The apparatus of claim 22 further comprising a condensation device that is configured to:
cool the process gas; and
reduce a humidity of the process gas.

24. The apparatus of claim 3 further comprising:
an air distributor in fluid communication with the flue gas; and
a pre-wash zone heat exchanger configured to cool pre-wash circulating liquid entering the tower;
wherein the air distributor is configured to maintain a water content of the process gas at no more than 10% by volume when the flue gas has a water content that exceeds 18% by volume.

25. The apparatus of claim 24 further comprising:
an absorption zone heat exchanger configured to cool absorption liquid entering the tower;
wherein the air distributor is configured to maintain a water content of the process gas at no more than 10% by volume when the flue gas has a water content that exceeds 18% by volume.

26. A method for absorption of sulfur dioxide from a flue gas, the method comprising:
flowing the flue gas through a reactor;
in the reactor, absorbing at a temperature, in an ammonia-bearing, circulating liquid that contains ammonium sulfite, sulfur from the flue gas;
collecting the liquid;
limiting oxygen content of material entering the reactor to a content that is no greater than 12% by volume; and
responsive to an excess aerosol content in effluent from the reactor, lowering the temperature.

27. The method of claim 26 further comprising, before the flowing, mixing air with the flue gas to form process gas; wherein the lowering includes lowering a temperature of the air.

28. The method of claim 27 wherein:
the absorbing includes providing the ammonia-bearing liquid in stages having different compositions; and
the absorbing has:
an absorption temperature; and
an absorption oxygen content that are controlled such that:
no less than 90% of the sulfur dioxide is removed from the flue gas; and
dust content of effluent from the reactor is no greater than 50 mg/Nm³.

29. The method of claim 28 wherein the process gas includes a water content that is in the range 4 to 15%.

30. The method according to claim 28 further comprising:
using the stages, controlling a gradient of a species selected from the group consisting of:
ammonium sulfite;
ammonium bisulfite; and
ammonium sulfate;
prior to the absorbing:
mixing air with the flue gas to form process gas; and
cooling and purifying the process gas; and
contacting the process gas with:
the ammonia-bearing liquid, in one or more of the stages that includes ammonium sulfite and ammonium sulfate; and,
then, a fine particle washing circulating liquid, in one or more of the stages that includes ammonium sulfite and ammonium sulfate,
whereby:
the stages;
the cooling and purifying; and
the contacting act together to absorb the no less than 90% of the sulfur dioxide.

31. The method of claim 30 further comprising adjusting a ratio of flue gas to air to control oxygen content of the process gas to a level no greater than 12%.

32. The method of claim 30 wherein:
the providing includes selecting, based on:
   a measured sulfur dioxide concentration of the flue gas; and
   an export emission index;
a number of the stages;
the number is greater than two;
the composition of a one of the stages includes:
   0.15-4.95% ammonium sulfite; and
   5-38% ammonium sulfate; and
the stages include:
   an upper absorption circulating liquid; and
   a lower absorption circulating liquid; and
the upper absorption circulating liquid has an ammonium sulfite content that is lower than that of the lower absorption circulating liquid.

33. The method of claim 30 wherein:
the providing includes selecting, based on:
   a measured sulfur dioxide concentration of the flue gas; and
   an export emission index;
a number of the stages;
the number is greater than two;
the composition of a one of the stages includes:
   0.15-4.95% ammonium sulfite; and
   5-38% ammonium sulfate; and
the stages include:
   an upper absorption circulating liquid; and
   a lower absorption circulating liquid; and
the upper absorption circulating liquid has a pH value that is lower than that of the lower absorption circulating liquid.

34. The method of claim 30 wherein a stage of the stages includes a fine particle washing circulating liquid having:
a composition that includes:
   0.003-1% ammonium sulfite; and
   0.3-38% ammonium sulfate; and
a pH value in the range 1-6.

35. The method of claim 26 wherein:
the lowering includes lowering a temperature of the liquid; and
the lowering a temperature of the liquid includes passing the liquid through a circulating water cooler.

36. The method of claim 35 further comprising:
providing cooling water to a water cooler; and,
in response to an excess ion condition in the cooling water, replacing a fraction of the cooling water with process water;
wherein the lowering a temperature of the liquid includes passing the liquid through the circulating water cooler.

37. The method of claim 36 wherein the replacing includes obtaining process water from a steam condensate treatment system that is configured to derive steam from an ammonium sulfate slurry.

38. The method of claim 35 further comprising crystallizing ammonium sulfate in the liquid by transferring heat from the flue gas to the liquid;
wherein the lowering a temperature of the liquid includes:
   increasing a flow rate of the air; and
   reducing a humidity of the air.

39. The method of claim 38 further comprising, when the flue gas has a water content greater than 15%:
reducing the water content to a water content in the range 8 to 13% by adding to the flue gas a dry gas having a water vapor volume content no greater than 5%; and
limiting the oxygen content to be no more than 12%.

40. The method of claim 39 wherein the dry gas includes air.

41. The method of claim 26 wherein the lowering lowers the temperature to a value that is within the range is 45-53° C.

42. The method of claim 26 wherein the limiting limits the oxygen content to a content that is no greater than 8%.

43. The method of claim 26 wherein:
the absorbing includes providing the ammonia-bearing liquid in stages having different compositions; and
the absorbing has:
   an absorption temperature; and
   an absorption oxygen content
that are controlled such that:
   no less than 90% of the sulfur dioxide is removed from the flue gas; and
   dust content of effluent from the reactor is no greater than 50 mg/Nm$^3$.

44. The method of claim 43 further comprising, before the flowing, mixing air with the flue gas to form process gas, wherein the process gas includes a water content in the range 4 to 15%.

* * * * *